United States Patent [19]
Goodknight et al.

[11] Patent Number: 6,008,964
[45] Date of Patent: Dec. 28, 1999

[54] CARTRIDGE LIBRARY AND METHOD OF OPERATION THEREOF

[75] Inventors: Curt Goodknight, Boulder; Steve W. Small, Golden; John Ellis, Louisville; Constance Kephart, Golden; Bruce Younglove; Christopher Clos, both of Boulder, all of Colo.

[73] Assignee: Exabyte Corporation, Boulder, Colo.

[21] Appl. No.: 08/971,043

[22] Filed: Nov. 14, 1997

[51] Int. Cl.$^6$ ............................. G11B 15/18; G11B 15/68
[52] U.S. Cl. .................................. 360/92; 360/69; 369/36
[58] Field of Search .......................... 360/92, 69; 369/34, 369/36, 38, 191–194, 178; 356/152.2, 152.3

[56] References Cited

U.S. PATENT DOCUMENTS

| | | |
|---|---|---|
| 3,833,807 | 9/1974 | Takeda ..................................... 250/234 |
| 4,869,591 | 9/1989 | MacGregor .............................. 356/153 |
| 4,972,277 | 11/1990 | Sills et al. . |
| 4,984,106 | 1/1991 | Herger et al. . |
| 5,059,772 | 10/1991 | Younglove . |
| 5,103,986 | 4/1992 | Marlowe . |
| 5,237,467 | 8/1993 | Marlowe . |
| 5,416,653 | 5/1995 | Marlowe . |
| 5,487,579 | 1/1996 | Woodruff et al. . |
| 5,498,116 | 3/1996 | Woodruff et al. . |
| 5,512,761 | 4/1996 | Winkelmann ...................... 250/559.38 |
| 5,661,287 | 8/1997 | Schaefer et al. . |

FOREIGN PATENT DOCUMENTS 60-225002  11/1985  Japan .

*Primary Examiner*—William J. Klimowicz
*Attorney, Agent, or Firm*—Nixon & Vanderhye P.C.

[57] ABSTRACT

An automated cartridge library (30) has plural cartridge receiving units which are precisely locatable so that a transport device (300) can accurately move a cartridge (90) between at least two of the cartridge-receiving units. The cartridge-receiving units and/or calibration cartridges inserted therein have an indicia (190) which is of contrasting reflectivity, the indicia having at least two sides (191, 192) which meet at a vertex (193). An illumination source (340) on the cartridge transport device makes two sweeps (Y1, Y2) of an illuminating beam over the indicia. Illumination transitions as detected by a sensor (350) during the two sweeps are used to determine a location of the indicia vertex (193). In the case of a cartridge-receiving unit being a multi-celled cartridge magazine, a rear wall (220) of the magazine has an aperture (222) for each cell. A mounting surface (60) upon which the magazine is mounted has a reflective portion (130) which is exposed through the aperture of the rear wall of the magazine when a cartridge is not in a predetermined cell in the magazine. To detect absence of a cartridge or a magazine, the illumination source directs an illuminating beam toward a predetermined position. A cartridge absence sensor (350) detects illumination reflected from the reflective portion of the mounting surface when the predetermined position is devoid of either a cartridge or a magazine.

28 Claims, 21 Drawing Sheets

CARTRIDGE LIBRARY AND METHOD OF OPERATION THEREOF

BACKGROUND

1. Field of the Invention

The present invention pertains to the storage of information, and particularly to automated cartridge handling systems such as cartridge libraries which store cartridges or cassettes of magnetic tape.

2. Related Art and Other Considerations

The economic and compact storage of information is increasingly important in the computer industry, particularly so as the computer unleashes new potentials in numerous fields such as audio visual and/or multimedia.

In the early days of computers, information requiring storage could be transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g., music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble juke boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

The following U.S. patents, all commonly assigned herewith and incorporated herein by reference, disclose various configurations of automated cartridge libraries, as well as subcomponents thereof (including cartridge engagement/transport mechanisms and storage racks for housing cartridges):

U.S. Pat. No. 4,984,106 to Herger et al., entitled "CARTRIDGE LIBRARY SYSTEM AND METHOD OF OPERATION THEREOF";

U.S. Pat. No. 4,972,277 to Sills et al., entitled "CARTRIDGE TRANSPORT ASSEMBLY AND METHOD OF OPERATION THEREOF";

U.S. Pat. No. 5,059,772 to Younglove, entitled "READING METHOD AND APPARATUS FOR CARTRIDGE LIBRARY";

U.S. Pat. No. 5,103,986 to Marlowe, entitled "CARTRIDGE RACK"; and,

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled "PICKER MECHANISM FOR DATA CARTRIDGES".

U.S. Pat. No. 5,059,772 to Younglove discloses a cartridge library wherein the cartridge magazines each have a reflective indicia used for precise placement of the magazine.

U.S. Pat. No. 5,661,287 to Schaefer et al. ("Schaefer") discloses a single laser light source in combination with a single reflectivity sensor for multiple sensing and calibration functions for a storage library subsystem. In Schaefer, a rotatable carousel has an "L-shaped" white target positioned at two joining edges of a void path on the edge of the carousel. Once the single laser light source and single reflectivity sensor have been employed to determine coordinates of the L-shaped target, the position of removable magazines relative to the L-shaped target are determined in view of known offsets. Thus, Schaefer does not separately sense the position of each magazine, but instead makes an estimation thereof based on expected offset from the L-shaped target and certain tolerances. In fact, the position of all of Schaefer's library components are estimated in view of fixed offsets from the target. However, as Schaefer acknowledges, there is variance in the seating of magazines within the library as well as other library tolerances. Accordingly, Schaefer's uni-target-based positioning requires that Schaefer provide various compensation measures when problems are encountered during operation of the cartridge gripper mechanism, as set forth in U.S. Pat. No. 5,661,287 to Schaefer et al. Moreover, Schaefer employs the same single reflectivity sensor both to sensing the presence of a cartridge, and to perform other functions such as calibration and cartridge barcode reading. Schaefer employs a single reflectivity sensor which monitors only a single location. Among its other problems, usage of the same reflectivity sensor does not allow Schaefer to distinguish between absence of a magazine and absence of a cartridge in the magazine. Further, Schaefer requires a label on every cartridge.

What is needed, therefore, and an object of the present invention, is a cartridge library providing precise component detection and location.

BRIEF SUMMARY OF THE INVENTION

An automated cartridge library has plural cartridge receiving units which are precisely locatable so that a transport device can accurately move a cartridge between at least two of the cartridge-receiving units. The cartridge-receiving units have, or accommodate cartridges which have, an uniquely locatable indicia. The indicia is of contrasting reflectivity and has at least two sides which meet at a vertex. An illumination source on the cartridge transport device makes two sweeps of an illuminating beam over the indicia; a reflected illumination sensor which detects transitions in illumination during the sweeps. A controller uses illumination transitions as detected by the sensor during the two sweeps to determine a location of the vertex of the cartridge-receiving unit. The indicia is preferably a triangle.

The cartridge-receiving units can take the form of a cartridge magazine, a specialized cartridge holder (such as a calibration cartridge holder), or a drive. In the case of a cartridge-receiving unit being a multi-celled cartridge magazine, a rear wall of the magazine has an aperture for each cell. A mounting surface upon which the magazine is mounted has a reflective portion which is exposed through the aperture of the rear wall of the magazine when a cartridge is not in a predetermined position (e.g., a predetermined cell) in the magazine. As the illumination source directs an illuminating beam toward the predetermined cell; a cartridge absence sensor detects illumination reflected from the reflective portion of the mounting surface when either (1) the magazine itself is absent, or (2) the predetermined cell in the magazine is devoid of a cartridge. Discrimination between an absent cartridge and an absent magazine in provided by providing relative displacement of the illuminating beam and the mounting surface, which results in termination of reflected illumination in the case of a mere missing cartridge but sustained reflected illumination in the case of a missing magazine.

The cartridge absence sensor is distinct from and located in spaced apart relation from a sensor which performs other functions such as library component location and cartridge barcode reading.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
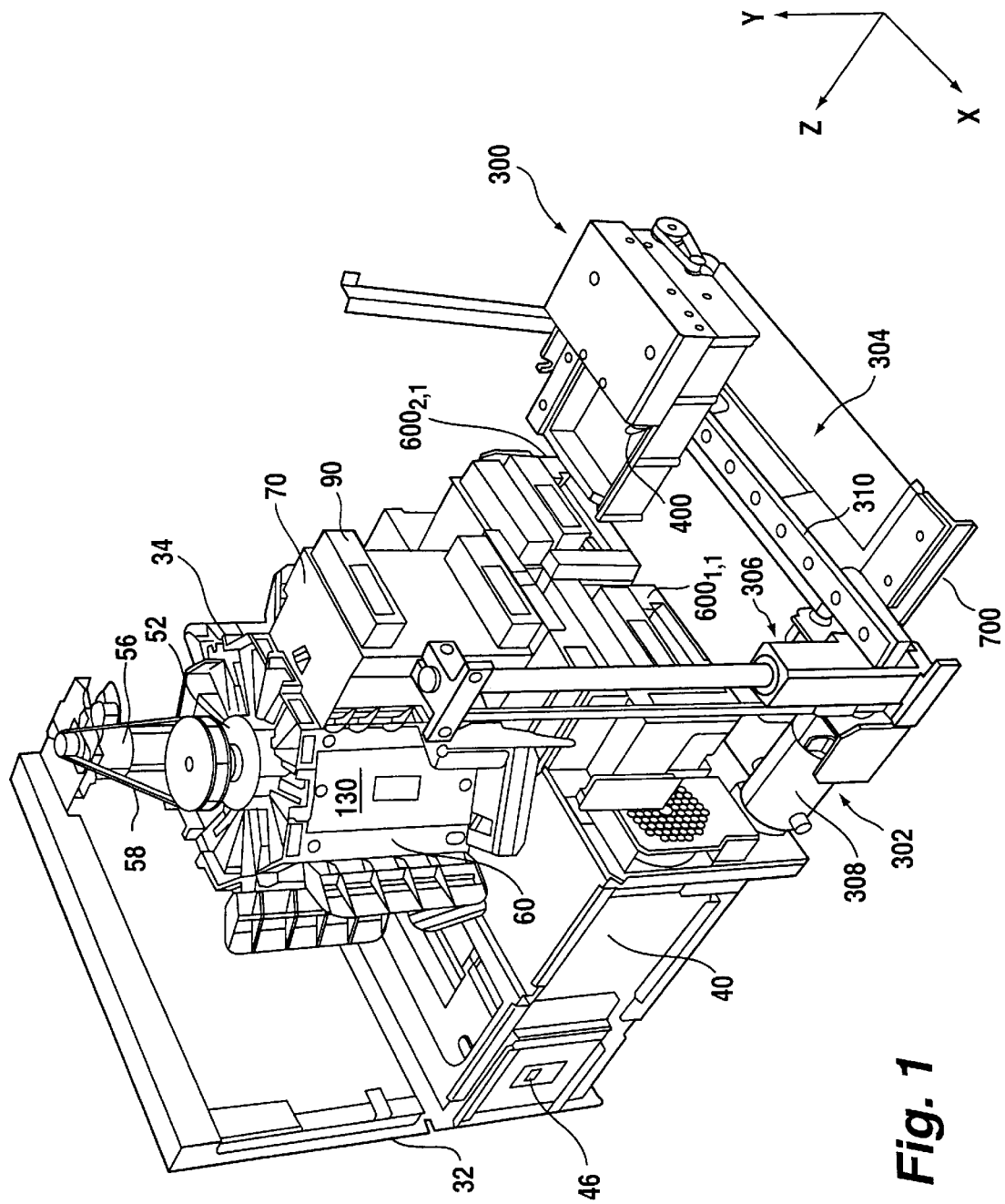
FIG. 1 is a perspective view of portions of a cartridge library (with housing removed) according to an embodiment of the invention.

FIG. 1 shows portions of a cartridge handling library 30 of the invention. In general, library 30 includes a library frame 32, a drum-like cartridge storage section 34; a drive section 38 formed in frame 32; and, a cartridge transport system 40.

Frame 32 includes a cabinet 42 upon which drum-like cartridge storage section 34 is mounted for rotation about axis 44. Drive section 38 is located in cabinet 42 below cartridge storage section 34. A controller 46, which can take the form of a microprocessor, for example, is located within library 30, and can be mounted on a circuit board. Controller 46 is operatively connected to the various motors and sensors constituting library 30 in order to supervise and coordinate operation of library 30.

Figure 2:
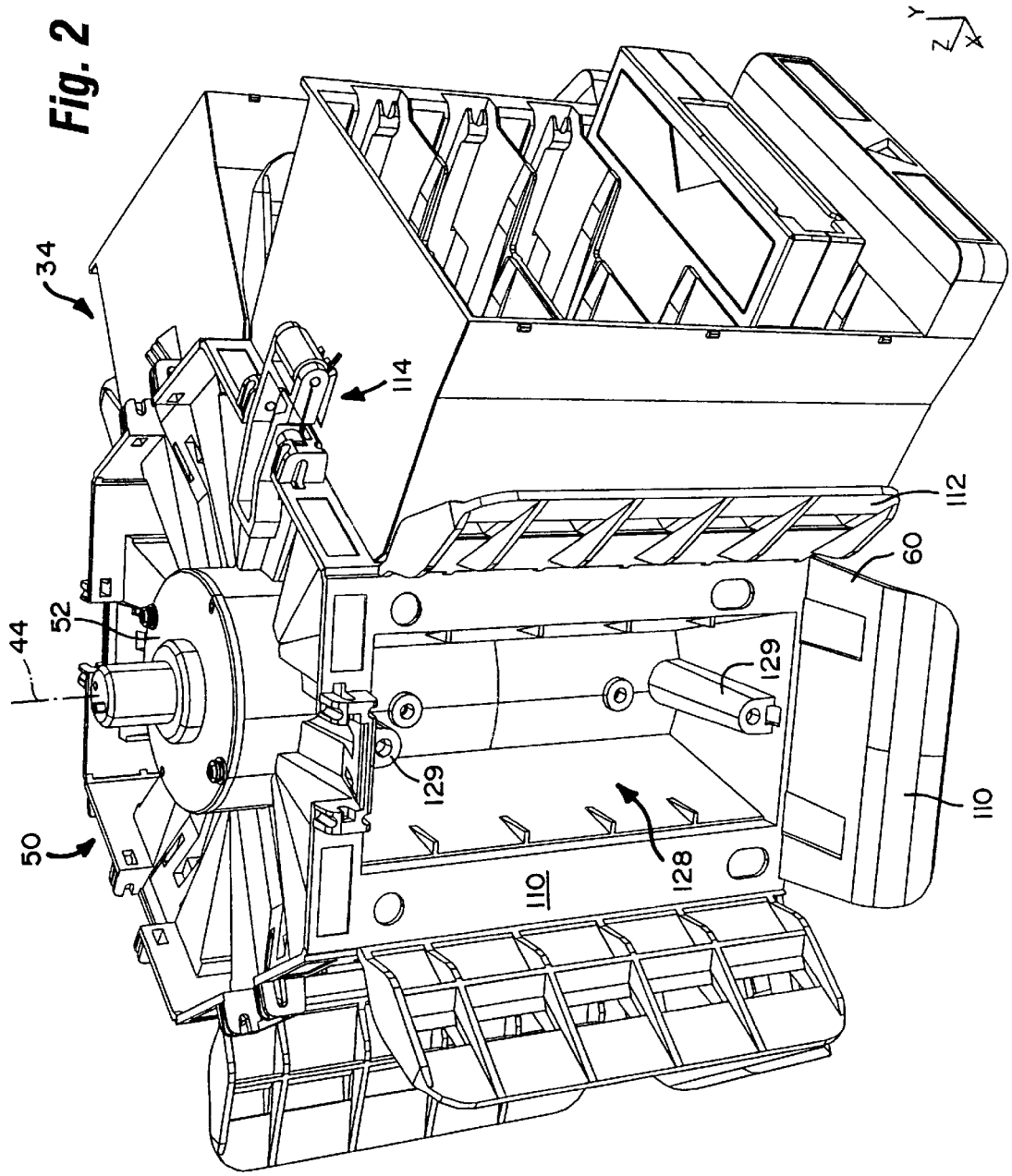
FIG. 2 is a perspective view of a cartridge storage section of the cartridge library of FIG. 1.
Figure 3:
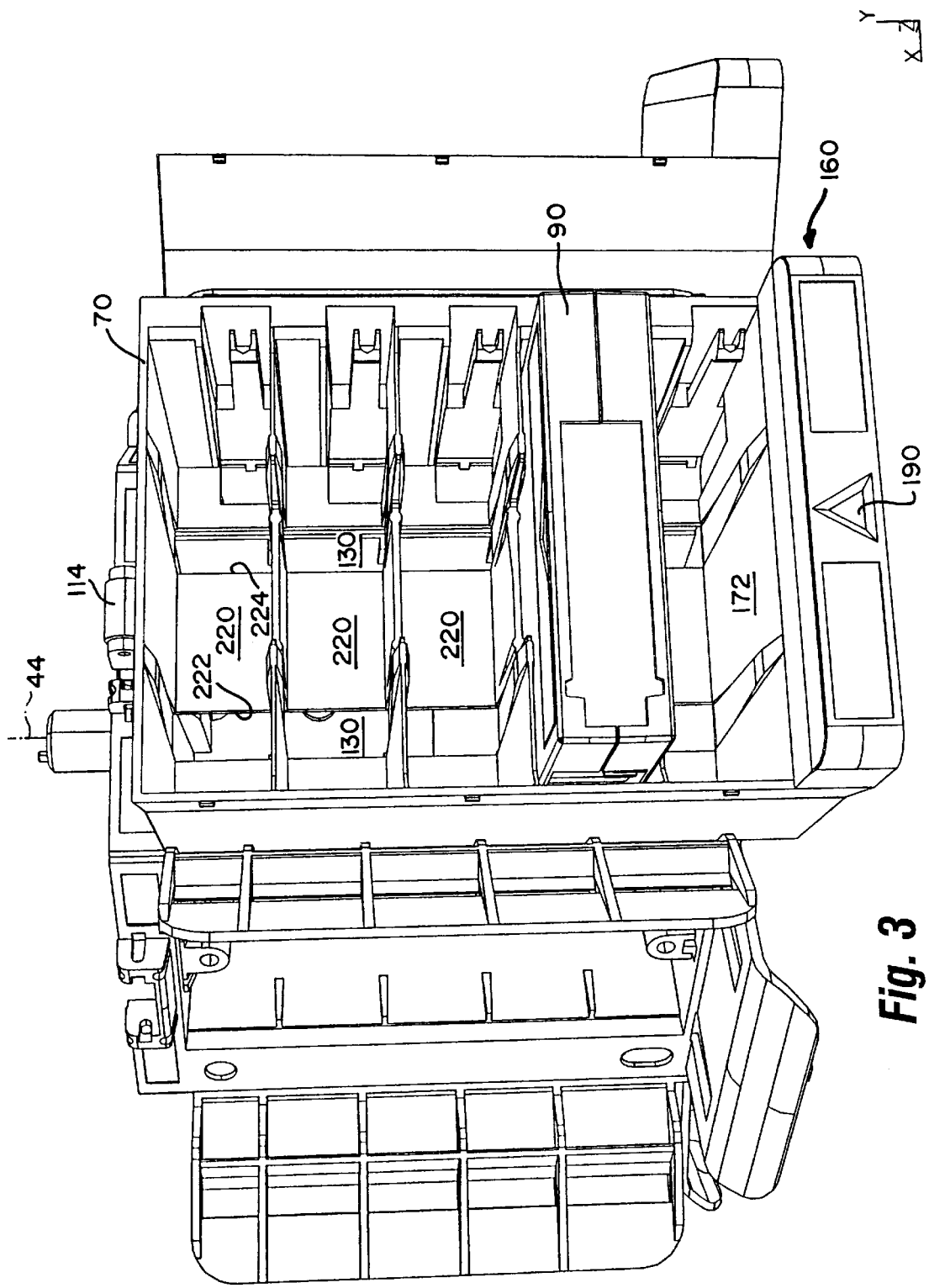
FIG. 3 is a front perspective view of the cartridge storage section of FIG. 2.
Figure 4:
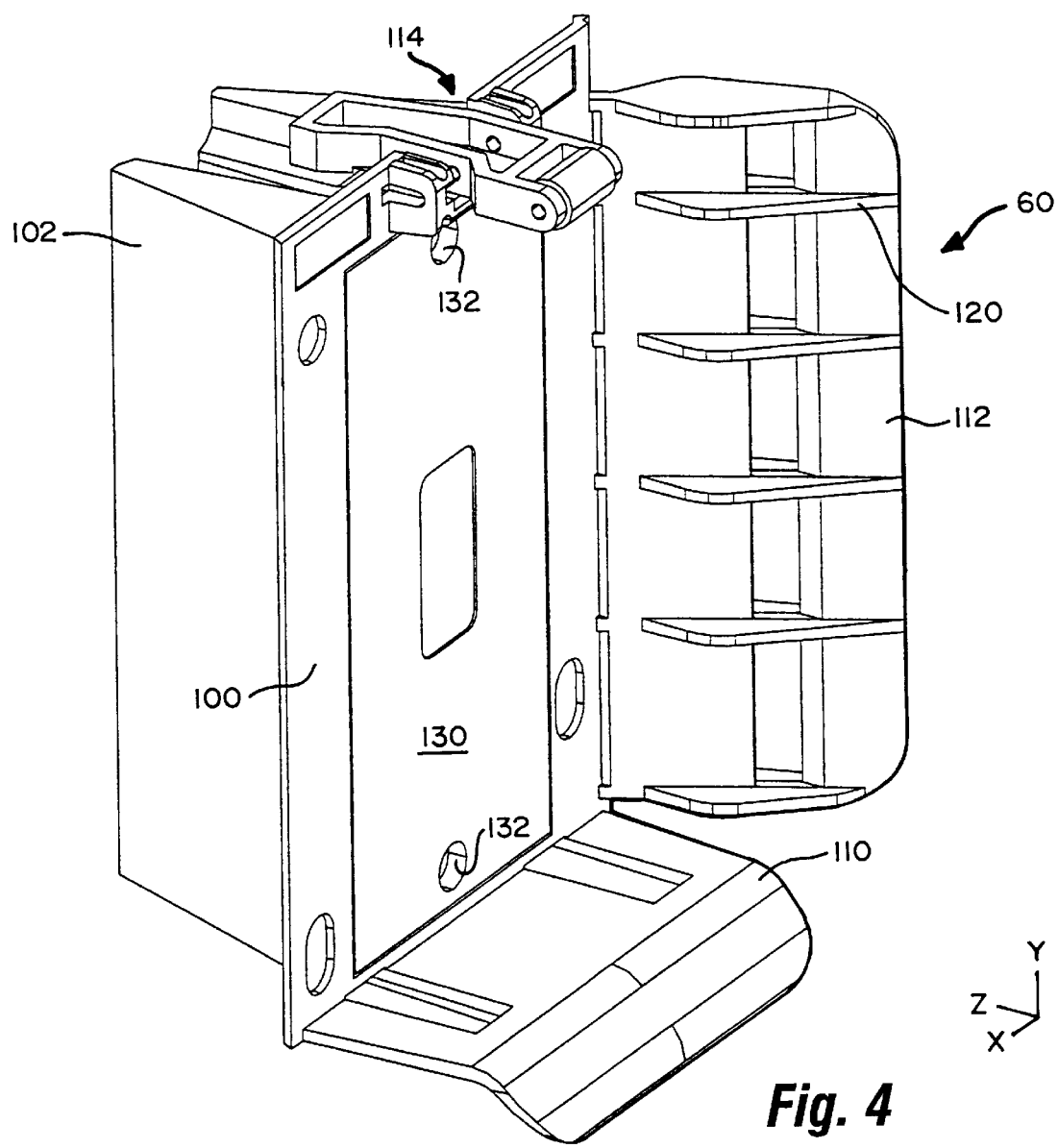
FIG. 4 is a side perspective view of a magazine mounting assembly included in the cartridge storage section of FIG. 2.

Cartridge storage section 34, seen in FIG. 2 and FIG. 3, includes a drum 50 which is generally hexagonal in shape. Drum 50 is comprised of a drum center cylindrical post 52 and six magazine mounting assemblies 60. Rotation of drum 50 is accomplished by a drum motor 56 which is operatively linked to drum 50 by a transmission system (e.g., transmission belt 58). One of magazine mounting assemblies 60 is shown in FIG. 4. Each magazine mounting assembly 60 is adapted to engage a cartridge magazine 70.

Figure 5:
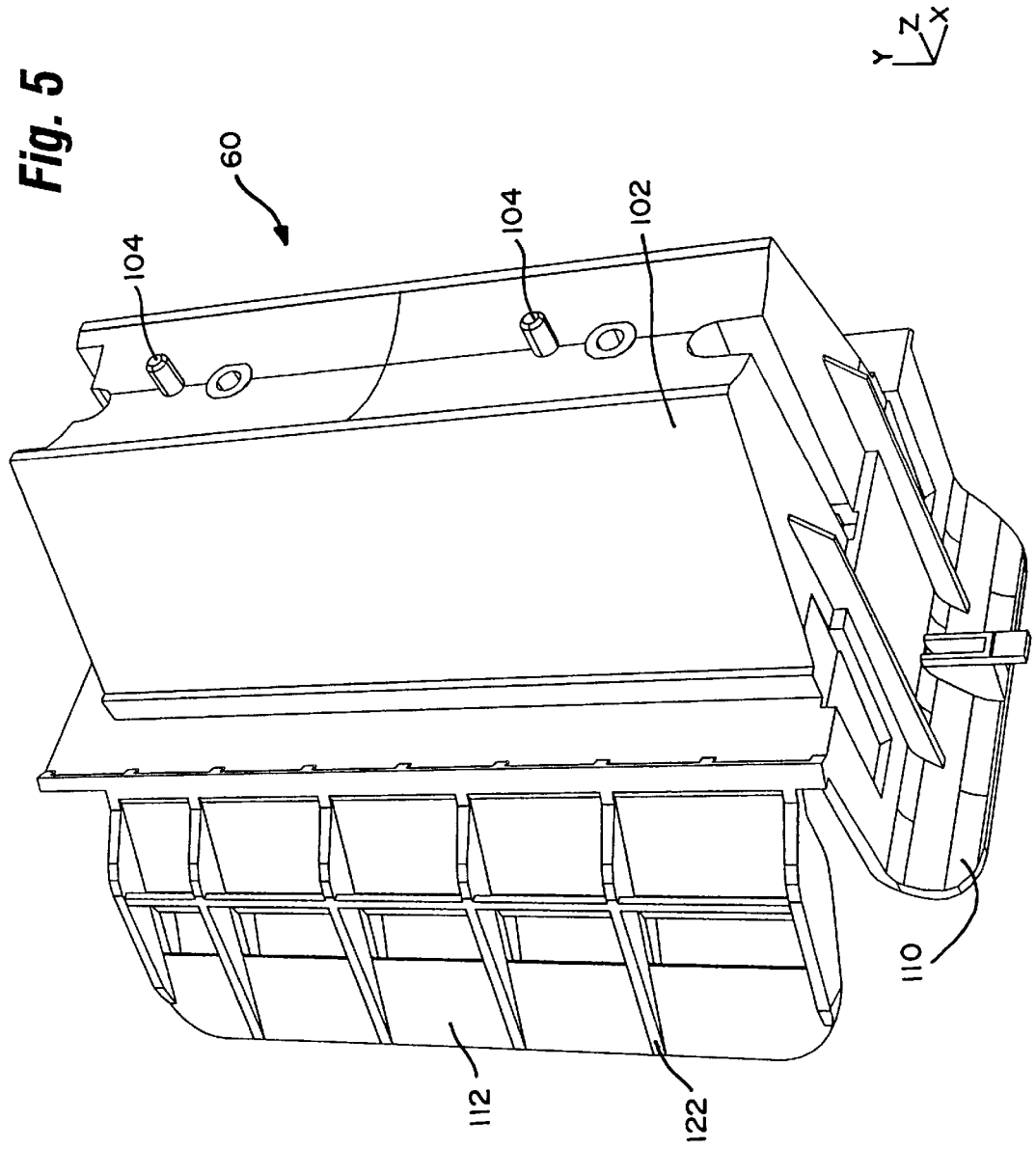
FIG. 5 is a rear perspective view from above of magazine mounting assembly of FIG. 4.
Figure 6:
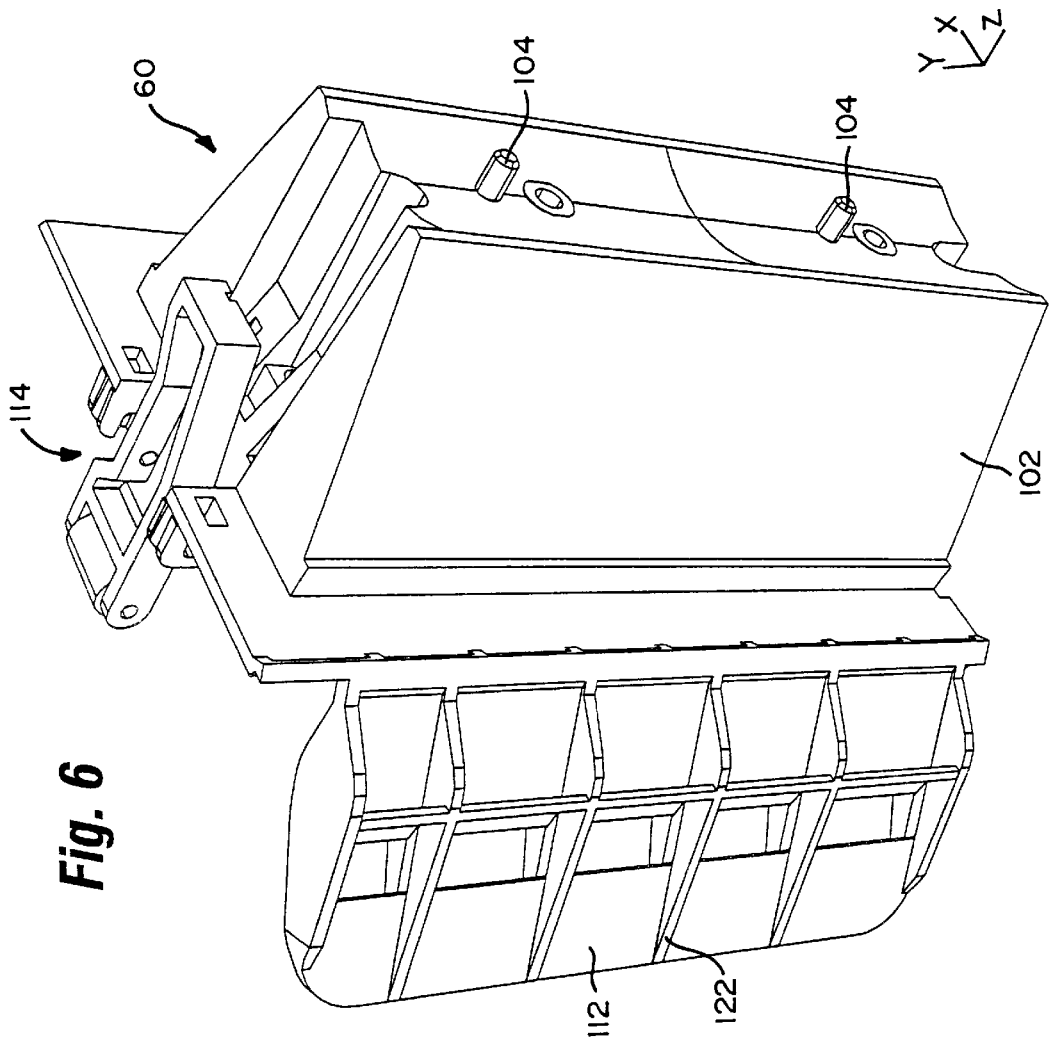
FIG. 6 is a rear perspective view from below of magazine mounting assembly of FIG. 4.
Figure 7:
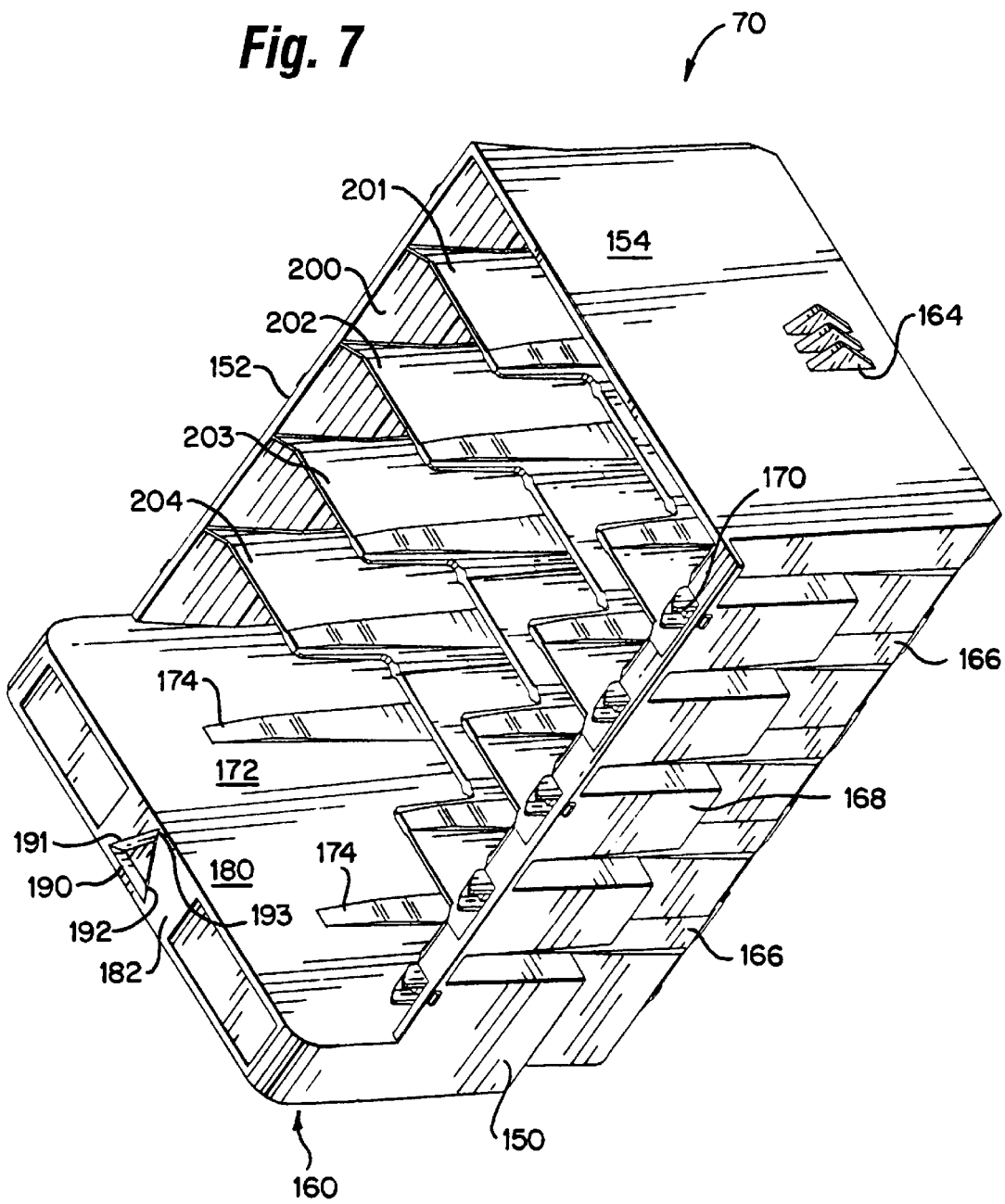
FIG. 7 is a right side front perspective view of a cartridge magazine insertable into the magazine mounting assembly of FIG. 4.

FIG. 4–FIG. 6 show a magazine mounting assembly 60 for use in library 30. Each magazine mounting assembly 60 has an essentially planar and rectangular mounting plate 100. A rear portion 102 of magazine mounting assembly 60 has an essentially wedge shape for abuting center cylindrical post 52. As shown from the rear in FIG. 5 and FIG. 6, rear portion 102 of magazine mounting assembly 60 has two dowels 104 which insert into corresponding holes in center cylindrical post 52.

Magazine mounting assembly 60 further has a magazine support shelf 110, magazine guide flange 112, and a resilient magazine retainer mechanism 114. Magazine guide flange 112 is angularly inclined with respect to mounting plate 100 and has both a series of native magazine guide ribs 120 (see FIG. 4) on its front surface and a series of neighboring magazine guide ribs 122 on its rear surface (see FIG. 5). While each magazine mounting assembly 60 has only one magazine guide flange 112 formed on its right side, on its left side the magazine mounting assembly 60 capitalizes upon the guide flange 112 of the neighboring magazine mounting assembly 60. Thus, when a cartridge magazine 70 is inserted into magazine mounting assembly 60, guidance therein is facilitated by native magazine guide ribs 120 on the magazine mounting assembly 60 into which the cartridge magazine 70 is being inserted, as well as the neighboring magazine guide ribs 122 on the neighboring magazine mounting assembly 60.

In its center, mounting plate 100 of magazine mounting assembly 60 has a rectangular aperture which communicates with an internal cavity 128 in magazine mounting assembly 60 (see FIG. 2). Internal cavity 128 has two fastener anchors 129 molded therein. A rectangular reflection plate 130 is sized to fit over the mouth of internal cavity 128. Reflection plate 130 is secured in mounting plate 100 by recessed fasteners 132 whose shafts are threadingly accommodated in fastener anchors 129 of rear portion 102. Reflection plate 130 is either formed from or coated with an optically reflective material, such as white plastic, for example.

FIG. 7–FIG. 13 show a cartridge magazine 70 adapted for insertion into the magazine mounting assemblies 60 of library 30. Cartridge magazine 70 has right side wall 150; left side wall 152; top wall 154; and a bottom portion 160. Top wall 154 has three chevron projections 164 which are engaged by resilient magazine retainer mechanism 114. Right side wall 150 has six channels 166 which are contoured to accommodate native magazine guide ribs 120 provided on magazine mounting assembly 60. Bays 168 are provided between and/or adjacent channels 166. In is interior, each bay 168 accommodates a resilient cartridge engagement tang 170.

Bottom portion 160 of cartridge magazine 70 includes a bottom wall 172 which has a pair of slightly elevated ramps 174 formed thereon. Projecting from bottom wall 172 is a magazine shelf 180. Magazine shelf 180 has a vertical skirt 182 formed therearound. Magazine skirt 182 has an indicia 190 formed on a front surface thereof. Indicia 190 is a polygon, such as a triangle in the illustrated embodiment, which has two sides (e.g., sides 191, 192) which meet at a vertex (e.g., vertex 193). Indicia 190 is not coplanar with skirt 182 of cartridge magazine 70. Particularly, in the illustrated embodiment indicia 190 is recessed within skirt 182. This recessing or beveling of sides of indicia 190 prevent any unwanted reflection proximate indicia 190. Moreover, indicia 190 is preferably of a contrasting color or contrasting reflectivity from skirt 182. For example, indicia 190 can be white, whereas the rest of cartridge magazine 70 can be black. In one embodiment, indicia 190 is formed by a triangular aperture extending through magazine shelf 180, with a white reflective tape adhereed to the back of magazine shelf 180 to cover the aperture from the rear.

Cartridge magazine 70 defines a plurality of cells. In the illustrated embodiment, cartridge magazine 70 defines five cells 200. Four partition walls 201–204 serve to divide the interior of cartridge magazine 70 into the five cells 200. On both its upper surface and lower surface, each partition has a ramp analogous to ramp 174. Each cell 200 accommodates a single cartridge, and accordingly has an associated one of the resilient cartridge engagement tangs 170 for engaging a side of a cartridge inserted therein.

Figure 8:
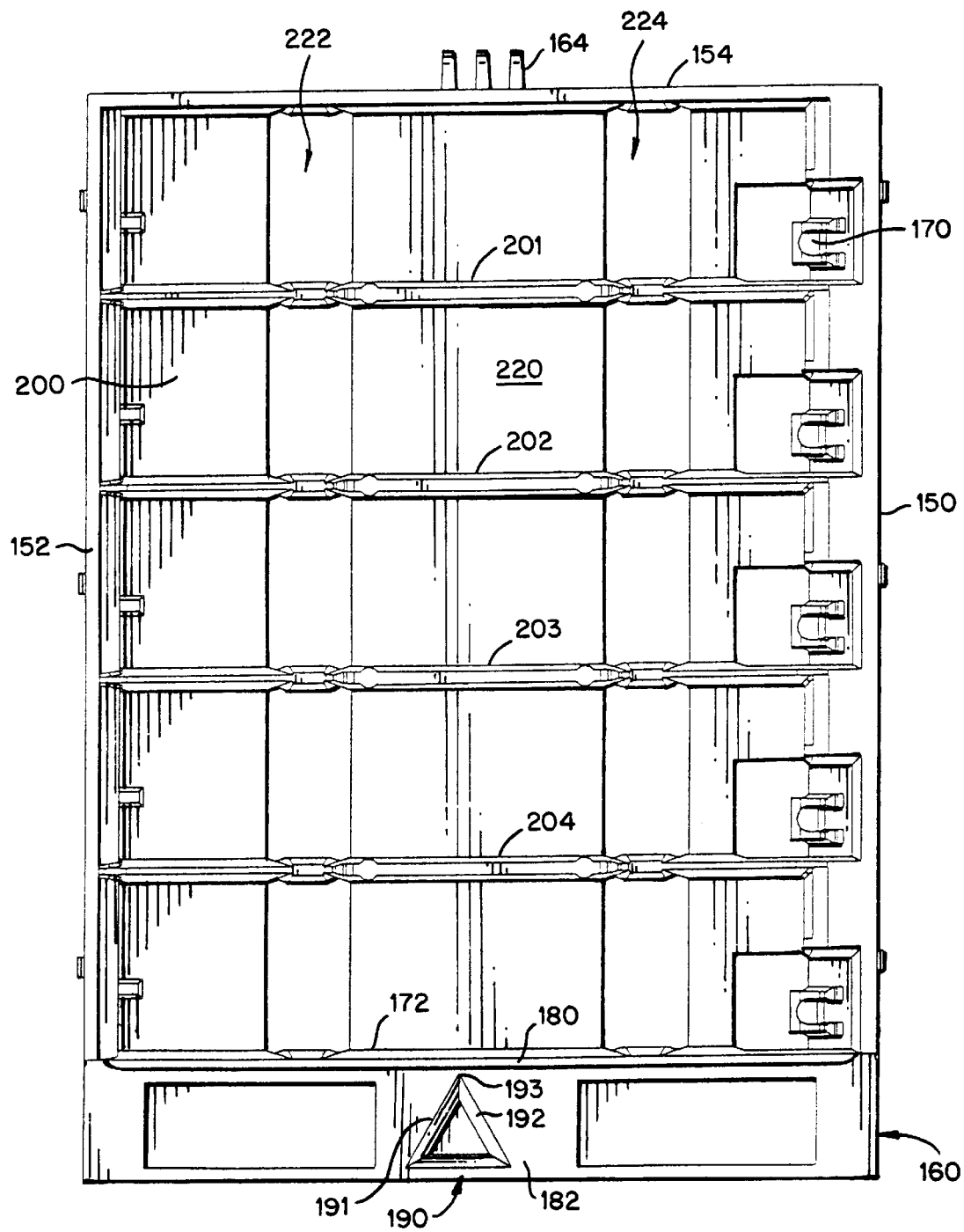
FIG. 8 is a front view of the cartridge magazine of FIG. 7.
Figure 9:
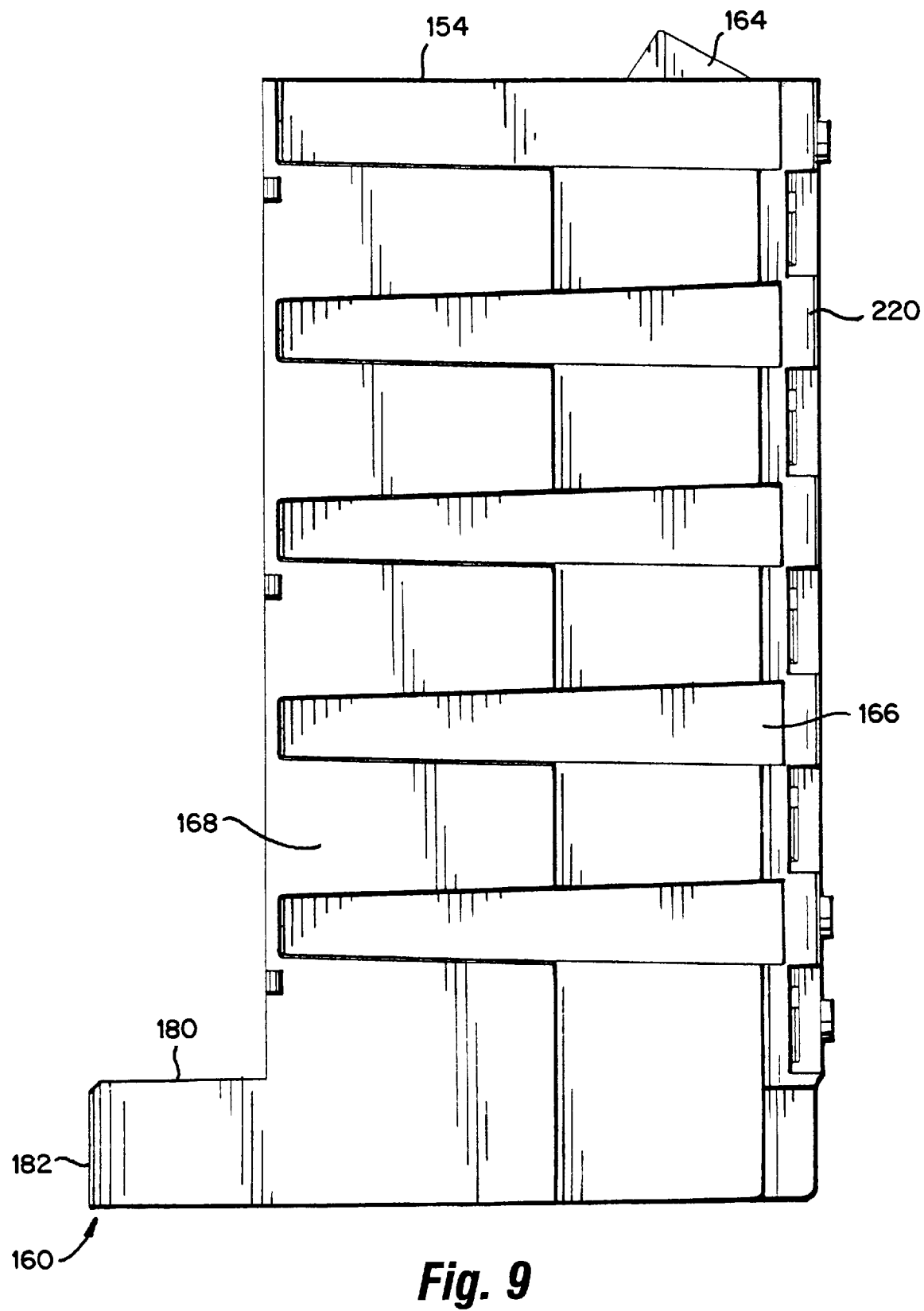
FIG. 9 is a right side view of the cartridge magazine of FIG. 7.
Figure 10:
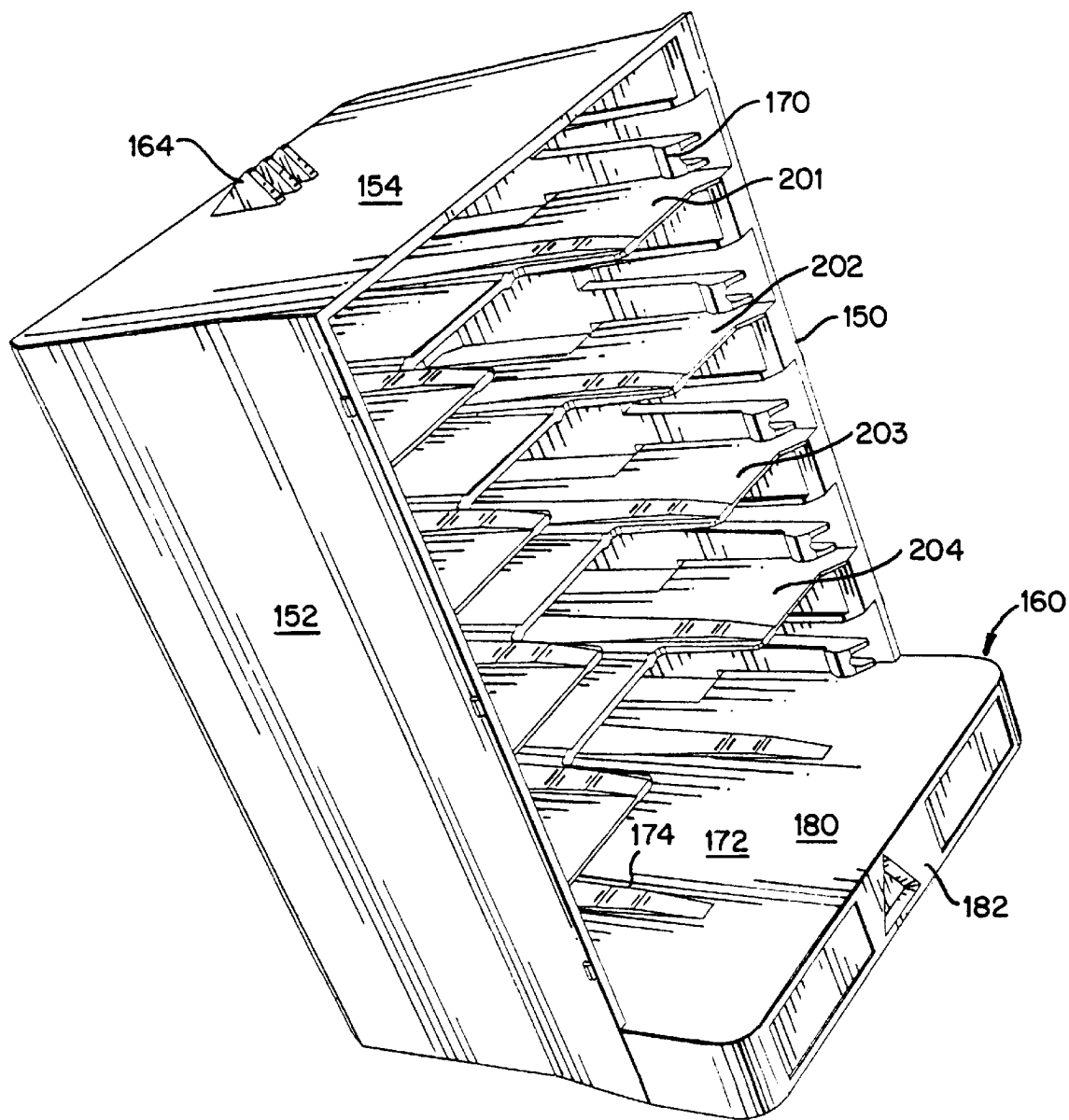
FIG. 10 is a left side front perspective view of the cartridge magazine of FIG. 7.
Figure 11:
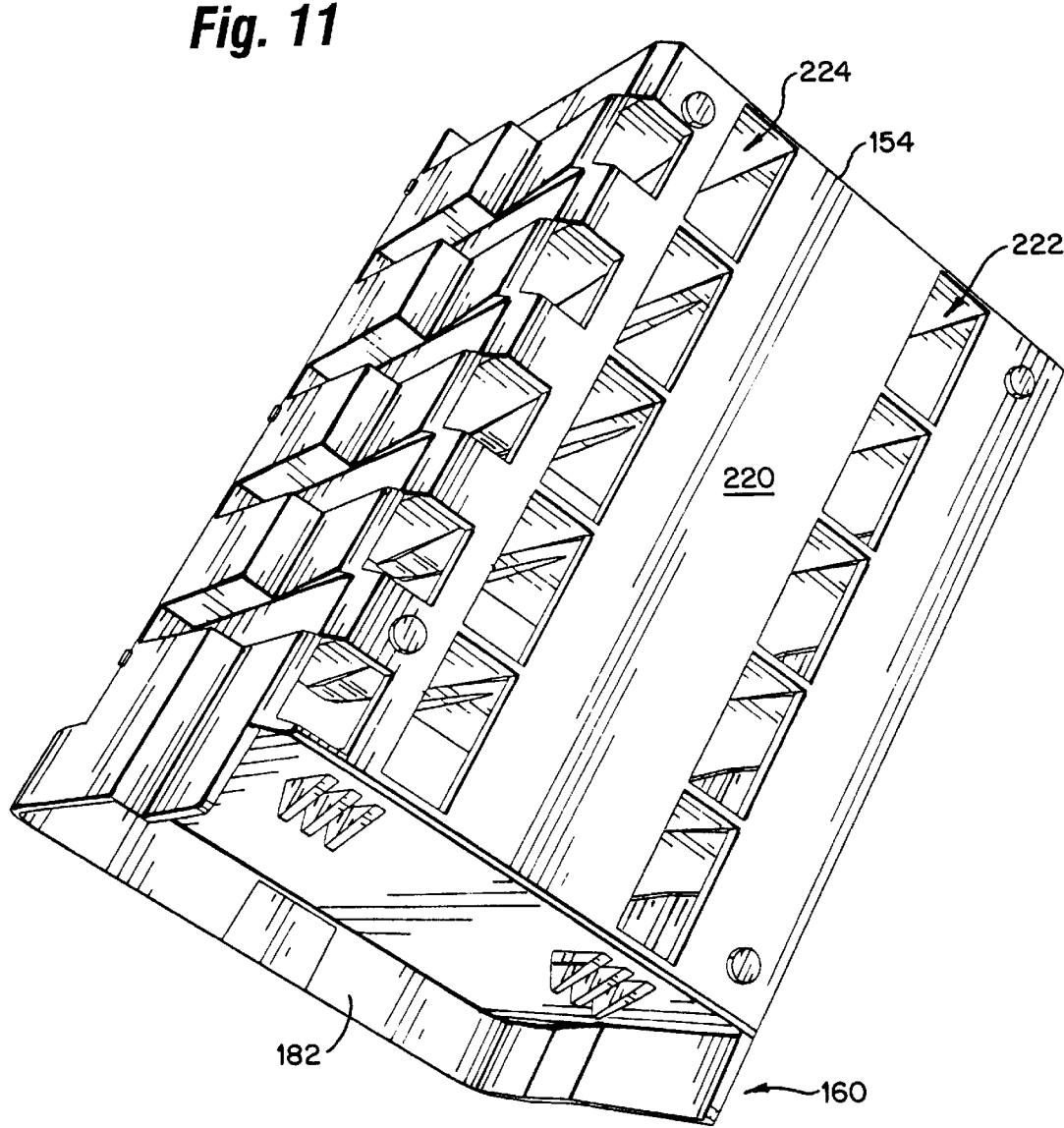
FIG. 11 is a rear perspective view of the cartridge magazine of FIG. 7.
Figure 12:
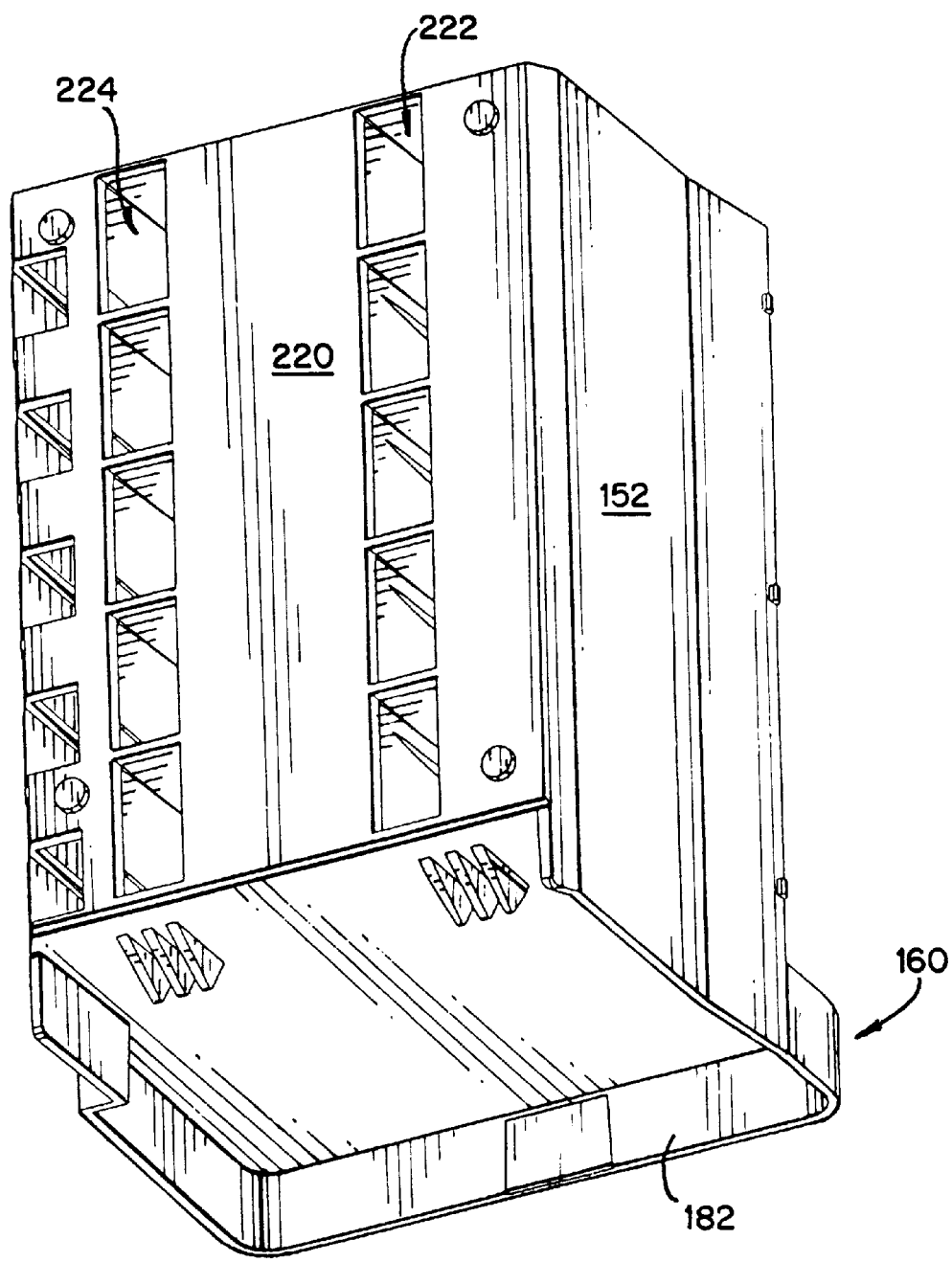
FIG. 12 is a bottom perspective view of the cartridge magazine of FIG. 7.
Figure 13:
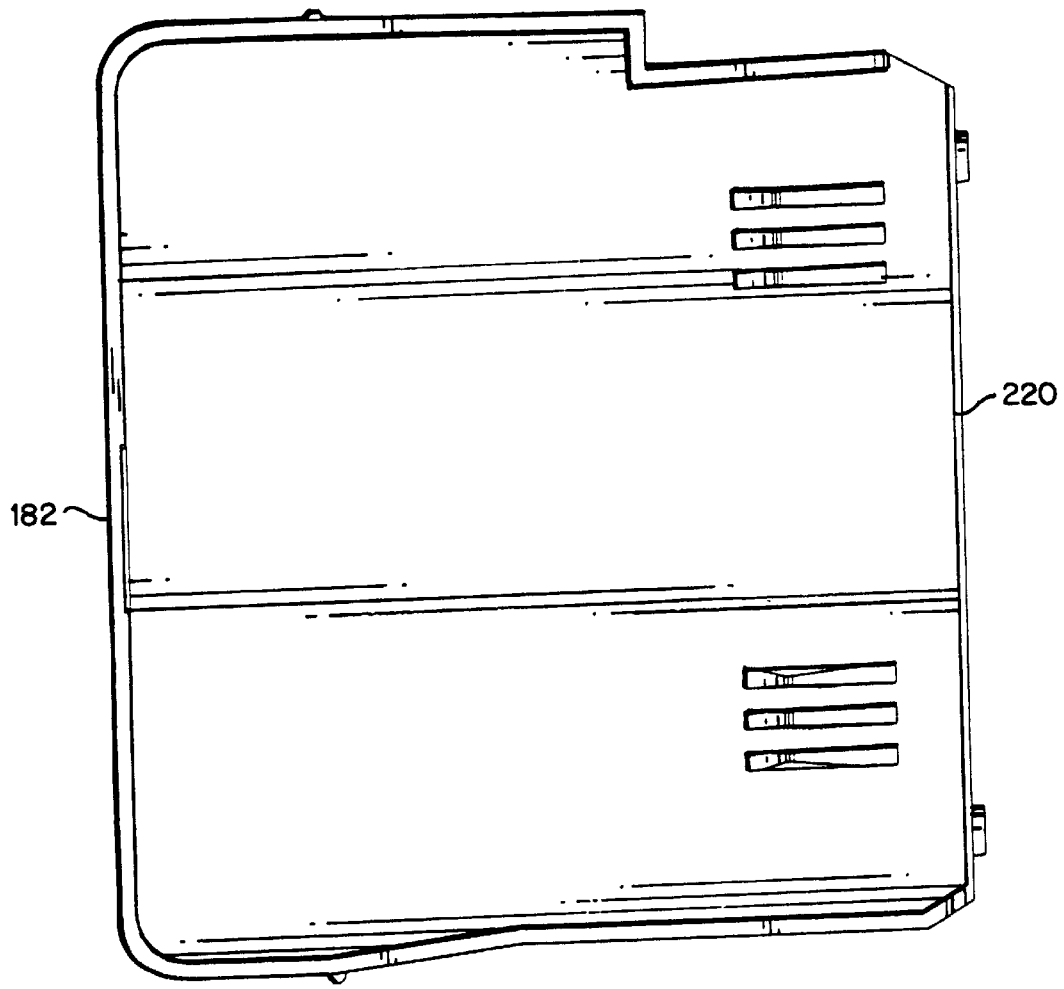
FIG. 13 is a bottom view of the cartridge magazine of FIG. 7.

As seen (for example) in FIG. 8 and FIG. 11, cartridge magazine 70 has a magazine rear wall 220. Magazine rear wall 220 has two columns 222, 224 of apertures formed therein. Henceforth, the apertures in column 222 shall simply be referred to as aperture 222, and the apertures in column 224 shall simply be referred to as aperture 224. Each cell 200 thus has two apertures, one from each column, i.e., an aperture 22 and an aperture 224.

FIG. 3 shows a cartridge magazine 70 inserted into a magazine mounting assembly 60 of library 30, with a cartridge 90 already inserted in one of the cells 200 of cartridge magazine 70. In particular, FIG. 3 shows a cartridge 90 inserted in a fourth cell from the top of cartridge magazine 70. In the three cells above cartridge 90 in FIG. 3, as well as the cell below cartridge 90 (e.g., the fifth cell of cartridge magazine 70), magazine rear wall 220 with its columns of apertures 222 and 224 is visible. Through apertures 222, 224 is exposed the reflection plate 130 of magazine mounting assembly 60.

As shown in FIG. 1, cartridge transport system 700 includes a cartridge gripper assembly 300 along with gripper vertical transport subsystem 302 and a horizontal transport subsystem 304. Vertical transport subsystem 302 includes a track 306 along which cartridge gripper assembly 300 can travel vertically under power of vertical direction motor 308. Similarly, horizontal transport subsystem 304 includes a track 310 along which cartridge gripper assembly 300 travels horizontally under power of a horizontal motor (hidden from view in FIG. 1). Such tracks and motors are conventional and examples thereof are provided in the incorporated references.

Figure 14:
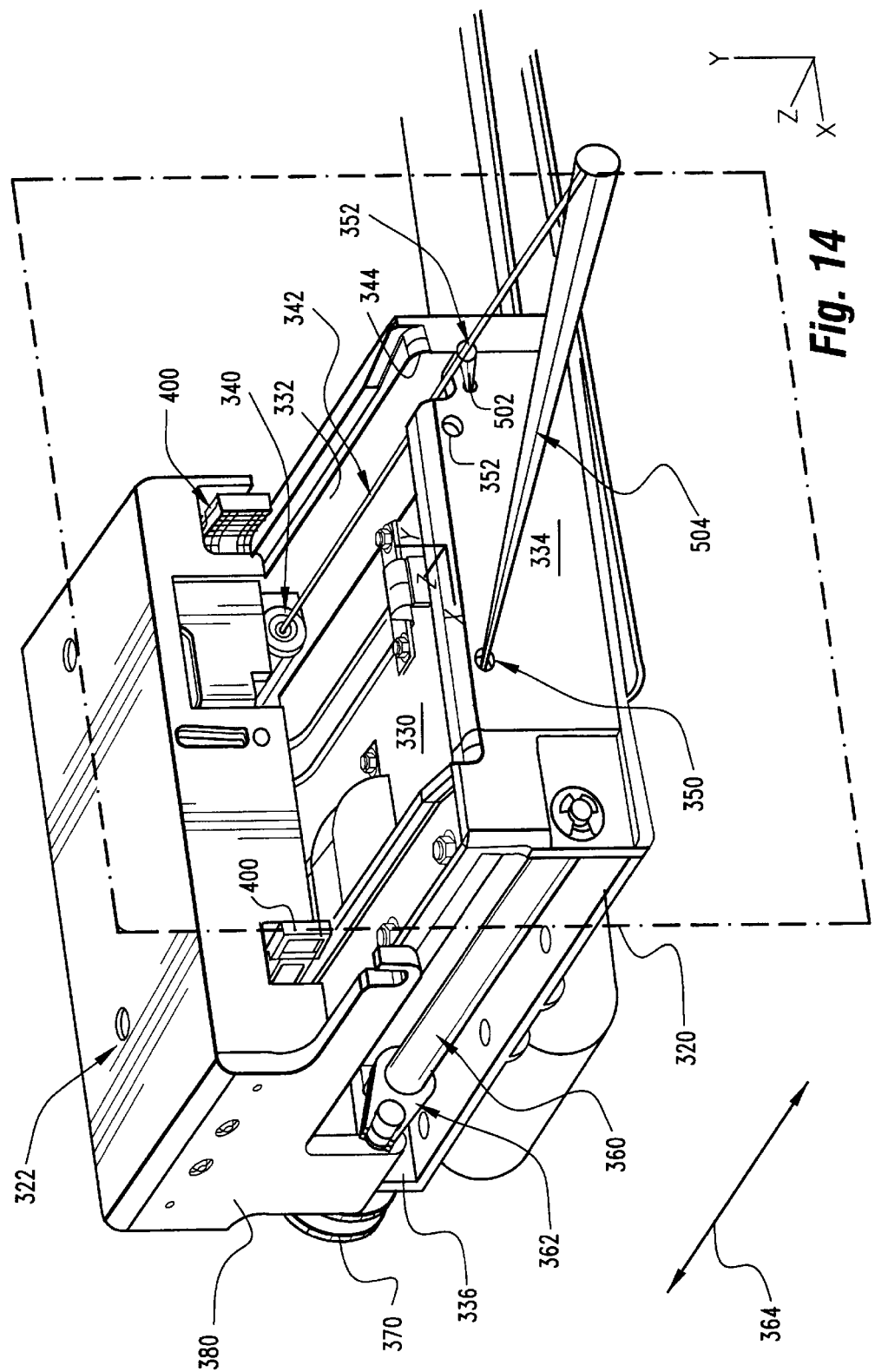
FIG. 14 is a perspective view of a cartridge transport assembly for the library of FIG. 1.
Figure 15:
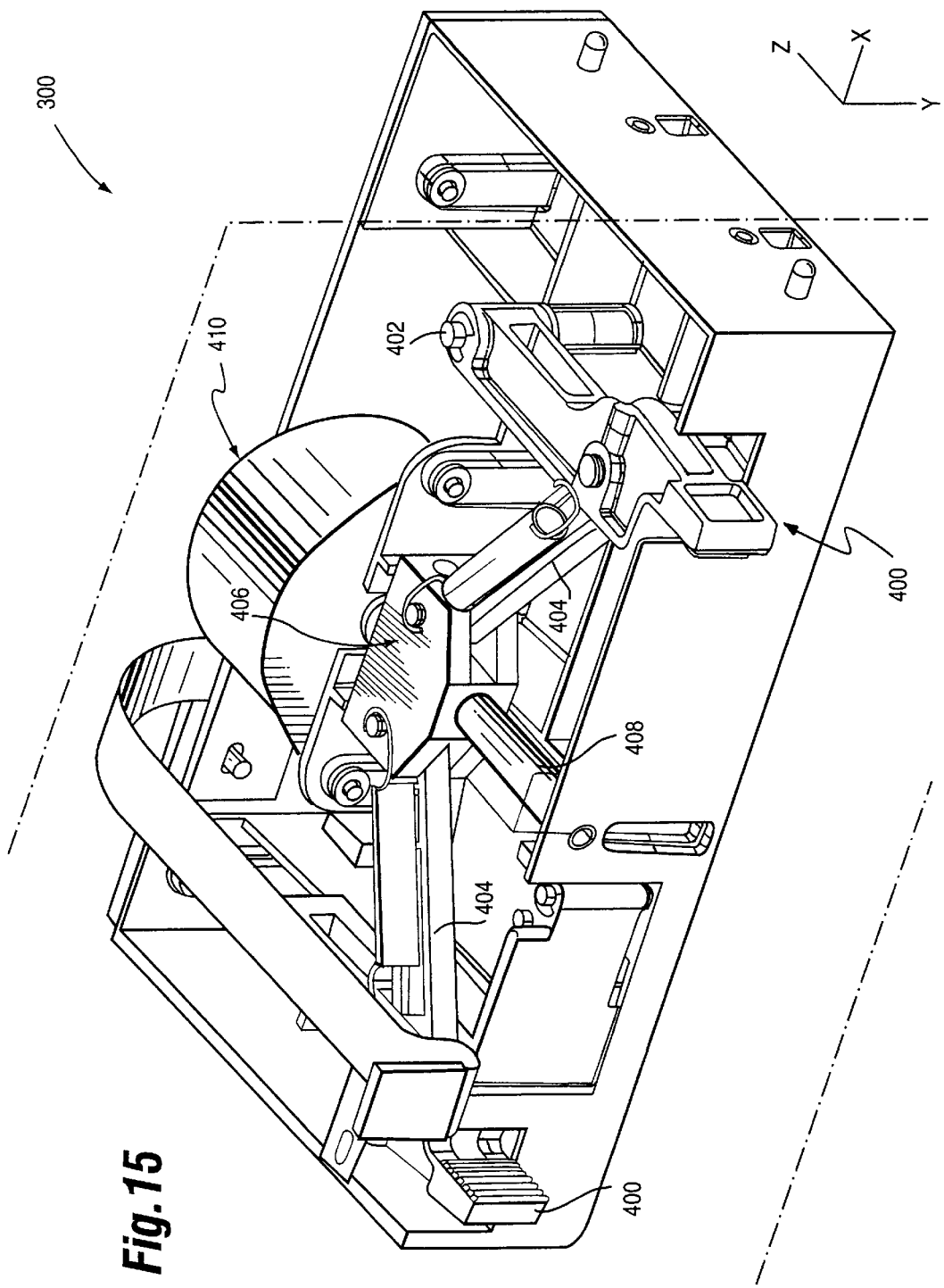
FIG. 15 is an inverted perspective view of a portion of the cartridge transport assembly of FIG. 14.

Cartridge gripper assembly 300 is shown in FIG. 14 as including a gripper base section 320 and a gripper translation section 322. FIG. 15 shows gripper translation section 322 removed from gripper base section 320 and turned over to an inverted position to expose internal components thereof.

Gripper base section 320 essentially has the shape of a square, open-top box, and includes a bottom wall 330, side wall 332, front wall 334, and rear wall 336. An illumination source, such as laser 340 is mounted on bottom wall 330 proximate the intersection of side wall 332 and rear wall 336. Laser 340 emits a beam 342 which is directed through an aligned notch 344 in front wall 334 (see FIG. 14).

In addition to having laser beam notch 344, front wall 334 of gripper base section 320 has two sensors mounted thereon, particularly cartridge absence sensor 350 and sensor 352. Sensor 352 serves as a a barcode reading sensor and a calibration sensor.

Figure 16:
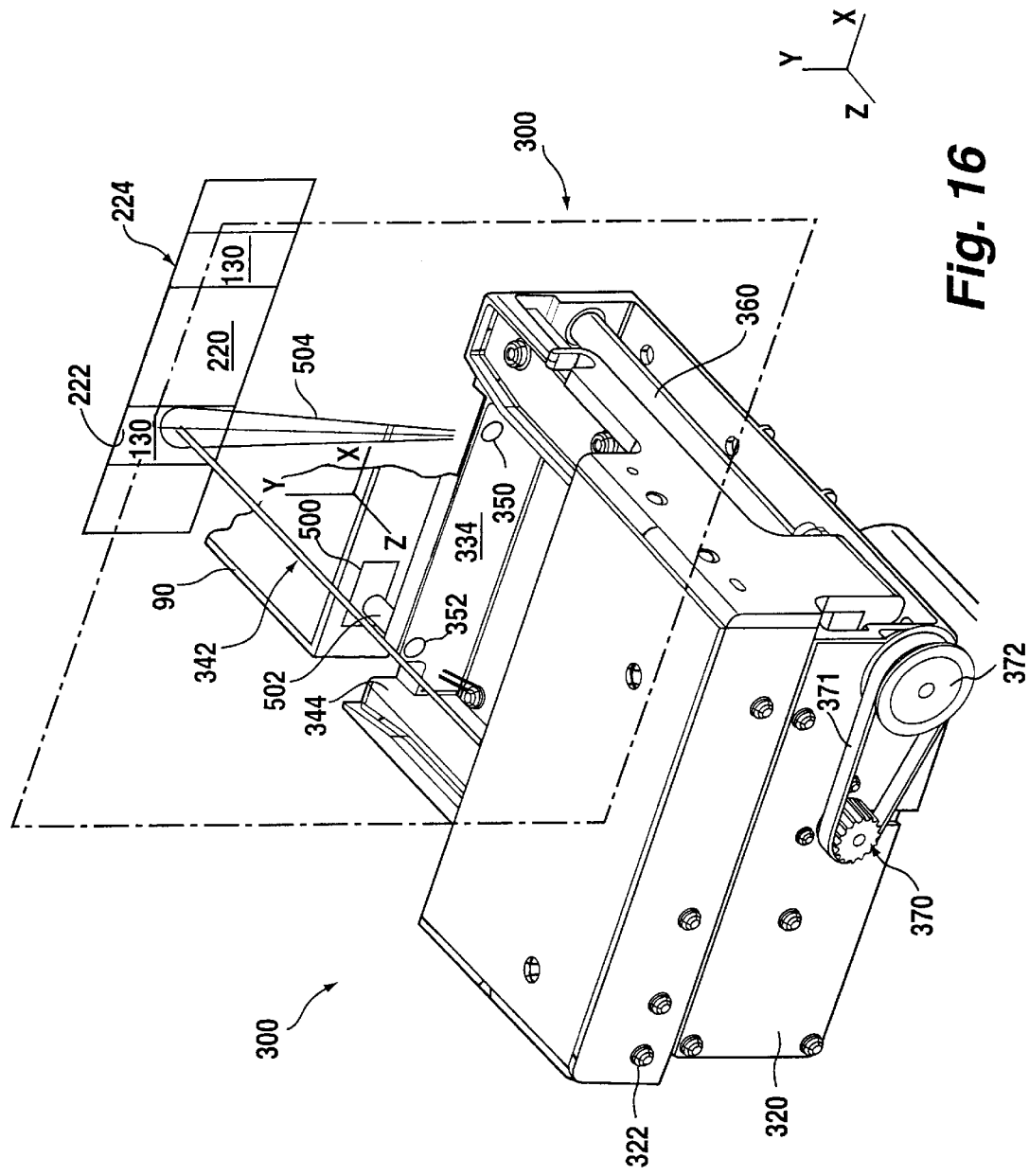
FIG. 16 is a rear perspective view of the cartridge transport assembly of FIG. 14.

As shown in FIG. 14, gripper base section 320 has a leadscrew 360 rotatably retained between its front wall 334 and rear wall 336. Lead nut 362 threadingly engages leadscrew 360 and is connected to gripper translation section 322. By virtue of this connection rotation of leadscrew 360 causes displacement of gripper translation section 322 in a direction toward and away from cartridge storage section 40 (e.g., in the direction of arrow 364 in FIG. 14). Rotation of leadscrew 360 is accomplished by an unillustrated motor which is located in gripper base section 320. The unillustrated motor has a motor pulley 370 which is shown in FIG. 16. Motor pulley 370 is connected by belt 371 to a pulley 372 mounted at the end of leadscrew 360.

Gripper translation section 322 has a side wall 380 which carries a projection to which lead nut 362 is engaged. FIG. 15 shows gripper translation section 322 removed from gripper base section 320 and turned upside down, and with side wall 380 removed. Thus, components of gripper translation section 322 as shown in FIG. 15 are inverted.

As shown in FIG. 15, gripper translation section 322 includes two spaced-apart gripper fingers 400 between which cartridges are selectively engaged. Gripper fingers 400 form part of an overall gripper activation mechanism which includes gripper pivot points 402, linkages 404 for connecting gripper fingers 400 to leadscrew nut 406, a rotatable leadscrew 408 upon which nut 406 travels, and a stepper motor 410 for selectively rotating leadscrew 408. As leadscrew 408 is rotated by activation of motor 410, nut 406 travels along leadscrew 408 and causes opening or closing of fingers 400 in accordance with the direction of travel of nut 406 (which depends upon the direction of rotation of leadscrew 408). The structure and operation of the gripper activation mechanism of gripper translation section 322 is understood with reference to U.S. Pat. No. 5,487,579 to Woodruff et al., entitled "PICKER MECHANISM FOR DATA CARTRIDGES", which is incorporated herein by reference.

Figure 18:
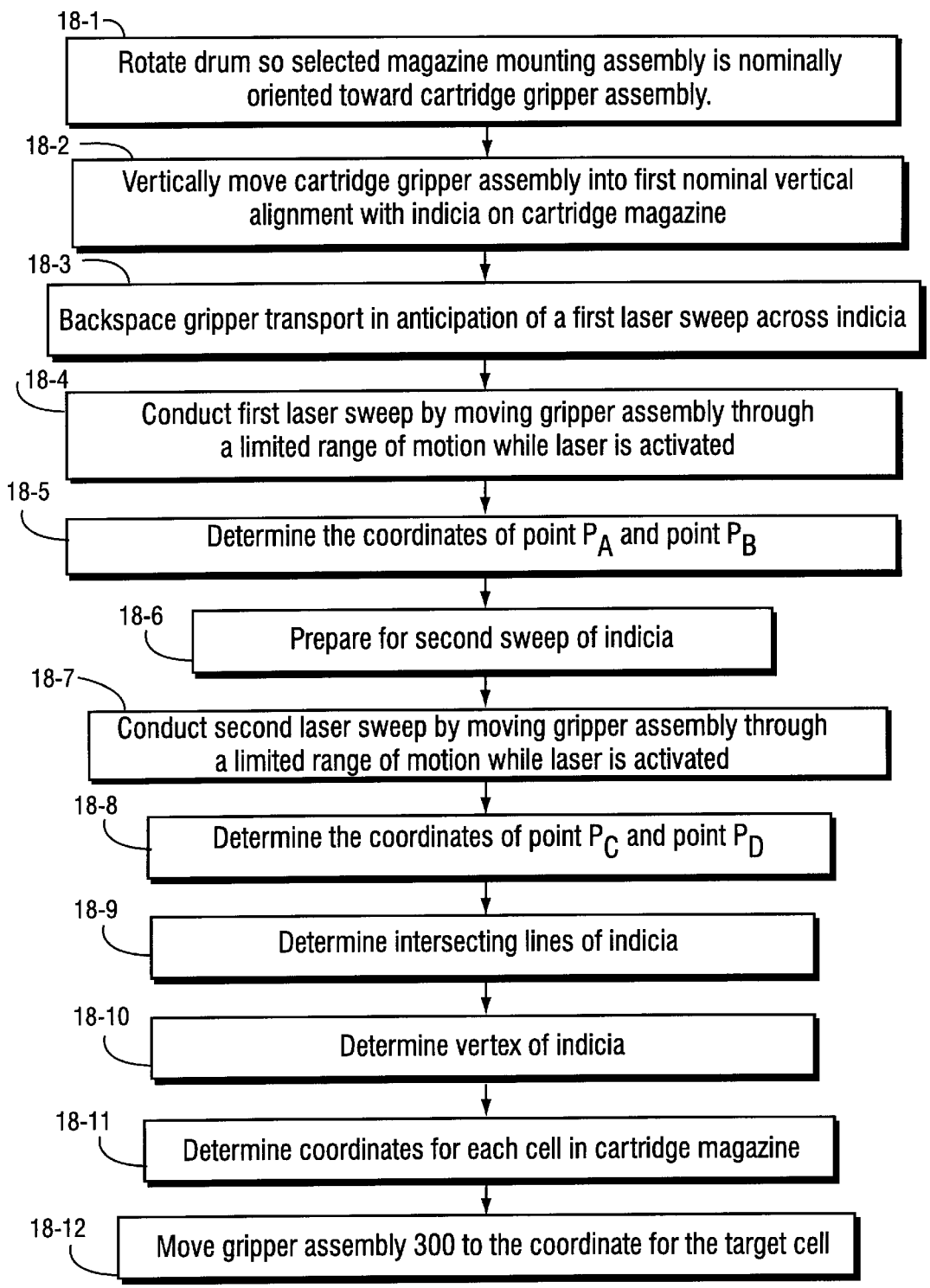
FIG. 18 is a flowchart showing basic steps involved in locating a cartridge magazine included in the library of FIG. 1.

FIG. 18 shows steps involved in locating a cell position in library 30. Performance of the steps of FIG. 18 is coordinated and supervised by controller 46. At step 18-1, drum 50 is rotated by motor 56 until a selected magazine mounting assembly 60 is nominally oriented to face cartridge gripper assembly 300. In this respect, drum 50 has an unillustrated mechanical flag mounted thereon which trips a sensor when drum 50 is in a home position. The motor for drum 50 has a position encoder. Controller 46 knows the number of encoder required from the home position to present each of the six faces of drum 50 to cartridge gripper assembly 300.

At step 18-2 cartridge gripper assembly 300 is translated to a first nominal vertical position for approximate alignment with indicia 190 on cartridge magazine 70. Controller 46 accomplishes vertical alignment by activating 308 (see FIG. 1). The nominal vertical position of step 18-2 is referred to as coordinate Y1. The coordinates indicative of the nominal vertical positions (e.g., Y1) are stored in a memory accessible by controller 46.

Figure 17:
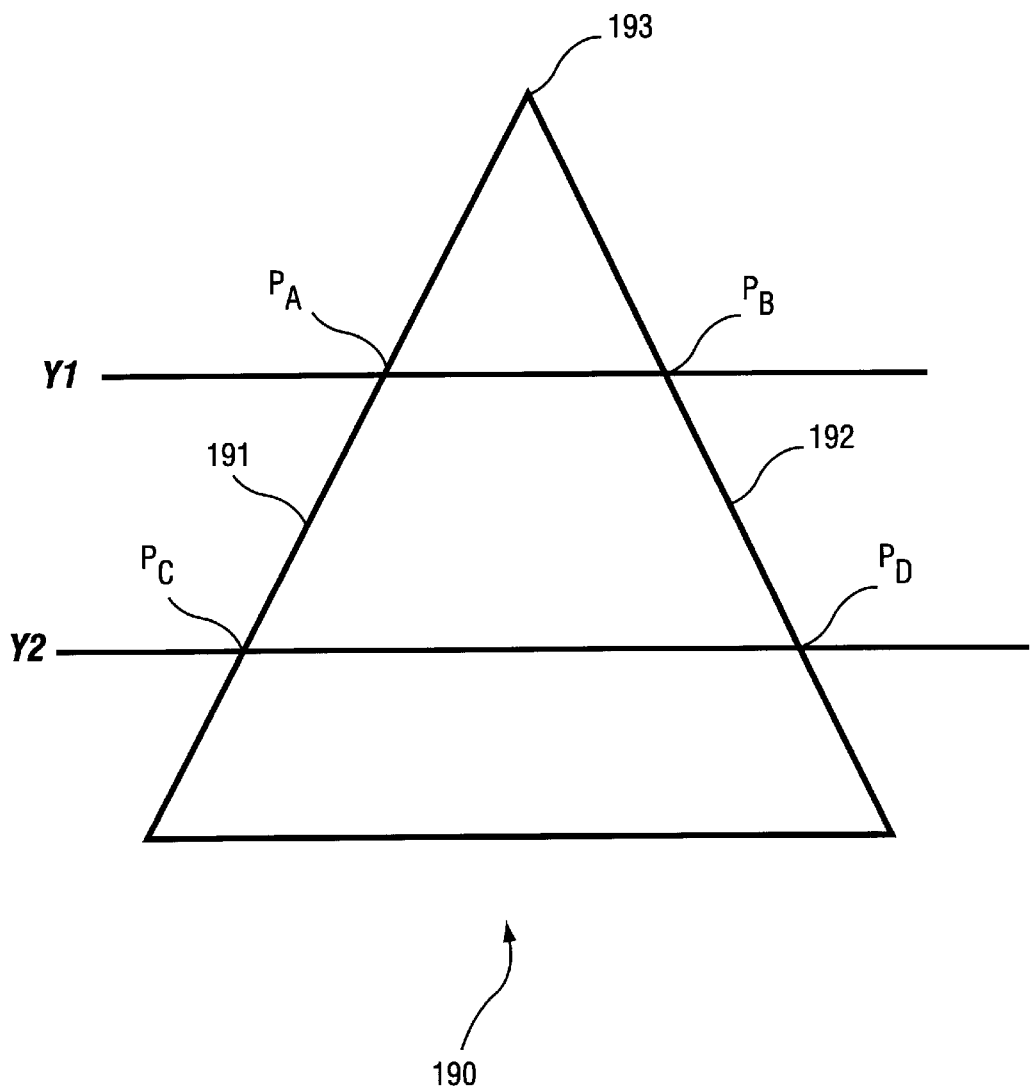
FIG. 17 is a diagrammatic view depicting laser sweeps across an indica in the library of FIG. 1.

With cartridge gripper assembly 300 vertically nominally aligned with indicia 190 on cartridge magazine 70, at step 18-3 cartridge gripper assembly 300 is moved horizontally leftward in anticipation of a first laser sweep across indicia 190. Then, at step 18-4, cartridge gripper assembly 300 is moved horizontally (rightward in FIG. 1) through a limited range of horizontal motion while laser 340 is activated, thereby accomplishing a first sweep. Such first sweep is illustrated by line Y1 in FIG. 17. During the first sweep, sensor 352 on front wall 334 of gripper base section 320 detects two reflectivity transitions. In particular, sensor 352 detects a first reflectivity transition at point $P_A$ and a second reflectivity transition at point $P_B$. For example, with indicia 190 having a white interior and the rest of cartridge magazine 70 being black, sensor 352 detects a transition from black to white at point $P_A$ and a transition from white to black at point $P_B$.

At step 18-5, controller 46 determine the coordinates of point $P_A$ and point $P_B$. The vertical coordinates of point $P_A$ and point $P_B$ are Y1, whereas other coordinates are obtained from the position encoder readouts of the motors (e.g., motor 308) at the time of the reflectivity transition.

Step 18-6 involves preparation for a second sweep of indicia 190. In such preparation, the vertical height of gripper assembly 300 is changed to a second nominal vertical position. In the example shown in FIG. 17, for example, the second nominal vertical position is Y2 which is lower than Y1 by a predetermined value. If it is desired that the second sweep be in the same direction as the first sweep, as part of the second sweep preparation cartridge gripper assembly 300 is horizontally backspaced past the position of indicia 190.

At step 18-7, a second sweep of indicia 190 is performed by again moving cartridge gripper assembly 300 through a limited range of horizontal motion while cartridge gripper assembly 300 is a vertical position Y2 and while laser 340 is activated. The second sweep is illustrated by line Y2 in FIG. 17. During the second sweep, sensor 352 on front wall 334 of gripper base section 320 again detects two reflectivity transitions. In particular, in the second sweep sensor 352 detects a first reflectivity transition at point $P_C$ and a second reflectivity transition at point $P_D$. Then, at step 18-8, in like manner with step 18-5, controller 46 determines the coordinates of point $P_C$ and point $P_D$. The vertical coordinates of point $P_C$ and point $P_D$ are Y2, whereas other coordinates are obtained from the tach readouts of the motors at the time of the reflectivity transition.

Step 18-9 involves controller 46 determining equations for lines 191 and 192 of indicia 190. The determination of lines 191 and 192 is easily performed since the coordinates of point $P_A$ and point $P_C$ are known on line 191; and the coordinates of point $P_B$ and point $P_D$ are known on line 192. Then, knowing the equations of lines 191 and 192, at step 18-10 controller 46 determines a point of intersection of lines 191 and 192, and thus determines vertex 193 of indicia 190. That is, the coordinates of indicia 190 are calculated and stored as a precise reference location for cartridge magazine 70.

Once the coordinates of vertex 193 of indicia 190 is exactly determined in the above manner for cartridge magazine 70, controller 46 can determine coordinates for each cell 200 in cartridge magazine 70. In this regard, controller 46 has a stored value representative of the offset of each cell from an indicia vertex for a standard cartridge 90. In the situation shown in FIG. 3, for example, in which cartridge 90 is stored in the second cell above magazine shelf 180, a standard offset value for a second cell is added to the Y coordinate for vertex 193 (as computed at step 18-10). Step X-12 shows cartridge gripper assembly 300 being moved to the coordinate for the target cell from which a cartridge is to be retrieved or into which a cartridge is to be inserted.

The procedure of FIG. 18, in which cartridge gripper assembly 300 is exactly aligned with each cartridge magazine 70 and then a target cell in magazine mounting assembly 60, is repeated for each of the plural magazine mounting assemblies 60 in library 30. In one mode of the invention, the location of each cartridge magazine 70 can be precisely obtained by the steps of FIG. 18 for each operation involving the cartridge magazine 70 (e.g., for each access of cartridge magazine 70). Alternatively, the coordinates of vertex 90 for each cartridge magazine 70, and the vertical offsets therefrom for each of the cells of the cartridge magazine 70, can be stored in a memory for reference by controller 46. Thereafter, in this alternate mode, controller 46 need only access the coordinates stored in memory. In either mode, the present invention is superior to techniques in which all magazines are assumed to have a constant offset from a reference position on the drum.

After cartridge gripper assembly 300 has moved to a target cell in the manner described above with reference to FIG. 18, it must be determined whether a cartridge 90 actually resides in the target cell, or whether the target cell is empty (i.e., the expected cartridge is absent). In addition, at least with reference to the alternate mode described above, for subsequent accesses of cartridge magazine 70 it should be confirmed, when cartridge 90 is absent from the cell in which it is expected, that the absence is not instead of the entire cartridge magazine 70. These cartridge/magazine sensing operations are described with reference to FIG. 19.

Figure 19:
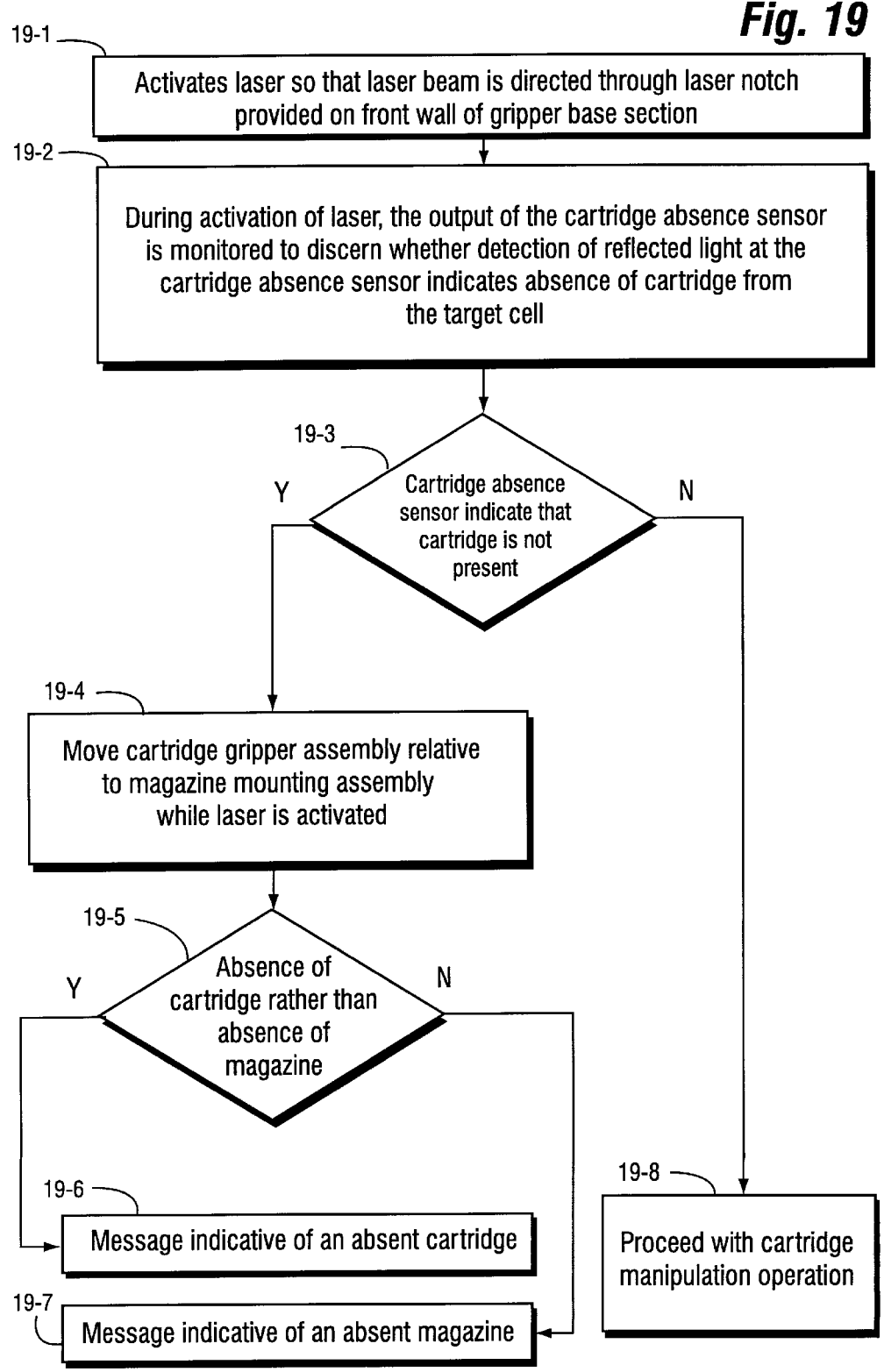
FIG. 19 is a flowchart showing basic steps involved in determining whether a cartridge is present or absent from an expected cell, or even whether cartridge magazine is entirely absent from the library of FIG. 1.

FIG. 19 shows steps involved in determining whether a cartridge is present or absent from an expected cell, or even whether cartridge magazine 70 is entirely absent. In FIG. 19, it is assumed that cartridge gripper assembly 300 has attained the vertical height of the target cell in the manner previously discussed.

At step 19-1, controller 46 activates laser 340 so that beam 342 is directed through laser notch 344 provided on front wall 334 of gripper base section 320. At step 19-2, during activation of laser 340 an output of cartridge absence sensor 350 is monitored by controller 46 to discern whether detection of reflected light at cartridge absence sensor 350 indicates absence of cartridge 90 from the target cell.

In connection with step 19-2, if cartridge 90 is present in the target cell, beam 342 strikes a surface 500 (that may or may not be reflective) on the front of cartridge 90 as shown in FIG. 16. Surface 500 can be, for example, a label (such as a barcode label) applied to the front of cartridge 90. Beam 342 striking surface 500 results in a reflection which is not seen in a field of view of sensor 350 (represented by cone 504 in FIG. 16 and FIG. 14). With no reflection seen in its field of view 504, at the time of laser activation the cartridge absence sensor 350 has a null or low output, which indicates to controller 46 that cartridge 90 is present in the target cell.

FIG. 16 also shows the alternative scenario in which it is determined at step 19-2 that cartridge 90 is absent from the target cell. In such alternative scenario, laser beam 342 travels into the target cell, travels through aperture 222 in magazine rear wall 220, and strikes reflection plate 130 provided on magazine mounting assembly 60 (see FIG. 4). The incidence of laser beam 342 on reflection plate 130 provides a reflected illumination which is within the field of view 504 of cartridge absence sensor 350. Receipt of reflected illumination of sufficient amplitude at cartridge absence sensor 350 results in a high signal being transmitted to controller 46, the signal being indicative of the fact that a cartridge 90 is not present in the location of the target cell.

At step 19-3 the controller 46 checks whether the output of cartridge absence sensor 350 indicates that a cartridge was not present. Of course, if a cartridge was present, the cartridge location procedure is completed as indicated by step 19-8 and cartridge manipulation can proceed. Otherwise, unless the presence of cartridge magazine 70 has just been detected in accordance with the steps of FIG. 18, controller 46 must discriminate whether it is the cartridge that is absent or whether the entire cartridge magazine 70 may be missing. In order to perform this discrimination, controller 46 performs necessary ones of steps 19-4 through 19-7.

At step 19-4, controller 46 issues a signal to cause relative displacement of cartridge gripper assembly 300 relative to magazine mounting assembly 60 while laser 340 is activated. That is, controller 46 can either cause drum 50 to rotate by activation of motor 56, or horizontally displace cartridge gripper assembly 300. Step 19-4 thus results in a horizontal sweeping of laser beam 342, and a corresponding sweep of field of view 504 of cartridge absence sensor 350. Within a predetermined time window the sweeping of the laser beam 342 and field of view 504, the reflected illumination incident on cartridge absence sensor 350 will either remain or will transition to a null, depending on whether cartridge magazine 70 is physically present on magazine mounting assembly 60. If cartridge magazine 70 is present on magazine mounting assembly 60, laser beam 342 and field of view 504 will move from reflection plate 130 to magazine rear wall 220 of magazine mounting assembly 60, thereby causing a transition to a null at cartridge absence sensor 350. On the other hand, if no cartridge magazine 70 is present in magazine mounting assembly 60, the sweeping of laser beam 342 and field of view 504 will continue across an uninterrupted reflection plate 130, so that a null does not occur at cartridge absence sensor 350 within a predetermined period of time.

Step 19-5 thus shows controller 46 determining if a transition of the output signal of cartridge absence sensor 350 occurs, thereby indicating an absence of cartridge 90 rather than an absence (e.g., removal) of cartridge magazine 70. In response to the determination at step 19-5, either a warning/error message indicative of an absent cartridge (step 19-6) or a warning/error message indicative of an absent magazine (step 19-7) is generated by controller 46.

Thus, library 30 of the present invention has two separate reflectivity sensors. Sensor 350 can be used to detect absence of either cartridge 90 or cartridge magazine 70. Sensor 352 is used to read cartridge barcodes and the positional indicia 190. The sensors 350 and 352 are situated in a spaced apart relationship in accordance with positions of the reflective surfaces from which each is prone to receive reflected illumination. Sensor 352 is capable of detecting illumination reflected from the front of a cartridge, while sensor 350 detects illumination reflected from reflection plate 130 of magazine mounting assembly 60 when a cartridge is absent.

When cartridge 90 is provided with a readable label such as a barcode, sensor 352 can be utilized to image the label and provide signals indicative of the label to controller 46. In the present illustration, it is assumed that reflective surface 500 is a barcode label. By activating laser 340 and sweeping laser beam 342 across the bar code label as drum 34 rotates, the barcode of the label can be read and relayed to controller 46.

Assuming that cartridge 90 has been confirmed to be present at a target cell and that the barcode read therefrom confirms that the cartridge 90 is to be moved to another location, cartridge gripper assembly 300 approaches the cartridge 90 in the target cell, engages the cartridge between gripper fingers 400, and retrieves the cartridge as cartridge gripper assembly 300 moves away from the cell. Once clearance of the cell is achieved, cartridge gripper assembly 300 can be moved to a different vertical coordinate, and particularly to the vertical coordinate of the desired or target destination of the selected and now-gripped cartridge. The target position may be either another cell in the same or another magazine mounting assembly 60, or one of the drives in drive section 38 of library 30.

If the target position is another magazine mounting assembly 60, drum 34 is rotated for nominal alignment with the target magazine mounting assembly 60 in anticipation of unloading the selected cartridge into a cell of the other magazine mounting assembly 60. The processing of unloading a gripped cartridge into a cell of the other magazine mounting assembly 60 follows essentially the same steps above depicted with reference to FIG. 18. In other words, at least in a first mode of the invention, the present invention uses the indicia 190 provided on the other magazine mounting assembly 60 in order to precisely locate the other magazine mounting assembly 60, and then to calculate the precise position of the target cell in the target magazine mounting assembly 60. This calibration procedure can be done on initialization or alternatively can be done on-the-fly as the cartridges are moved. The cartridge is carried by cartridge gripper assembly 300 to the precisely determined cell coordinates, with cartridge gripper assembly 300 moving toward the target cell and releasing the cartridge from between gripper fingers 400 and into the target cell.

If the target position is a drive in drive section 38, the controller 46 of the present invention must either now, or must have earlier, precisely locate the target drive. As shown generally in FIG. 1, and shown in more detail diagrammatically in FIG. 20, two vertical columns of drives are provided in drive section 38, with each column having one drive. Thus, the first column has drive $600_{1,1}$, the second column has drive $600_{2,1}$. It should be understood that a greater number of drives can be provided in each column if desired. Each drive 600 has a slot into which cartridge 90 is insertable.

Each column of drives is surmounted by a vertically aligned cartridge storage position 602, in particular calibration cartridge storage position $602_1$ being shown for the drives of the first column (e.g., drive $600_{1,1}$) and calibration cartridge storage position $602_2$ being shown for the drives of the second column (e.g., drive $600_{2,1}$). Thus the cartridge storage position $602_1$ and the cartridge storage position $602_2$, both have a predetermined alignment with their corresponding drives.

Figure 20:
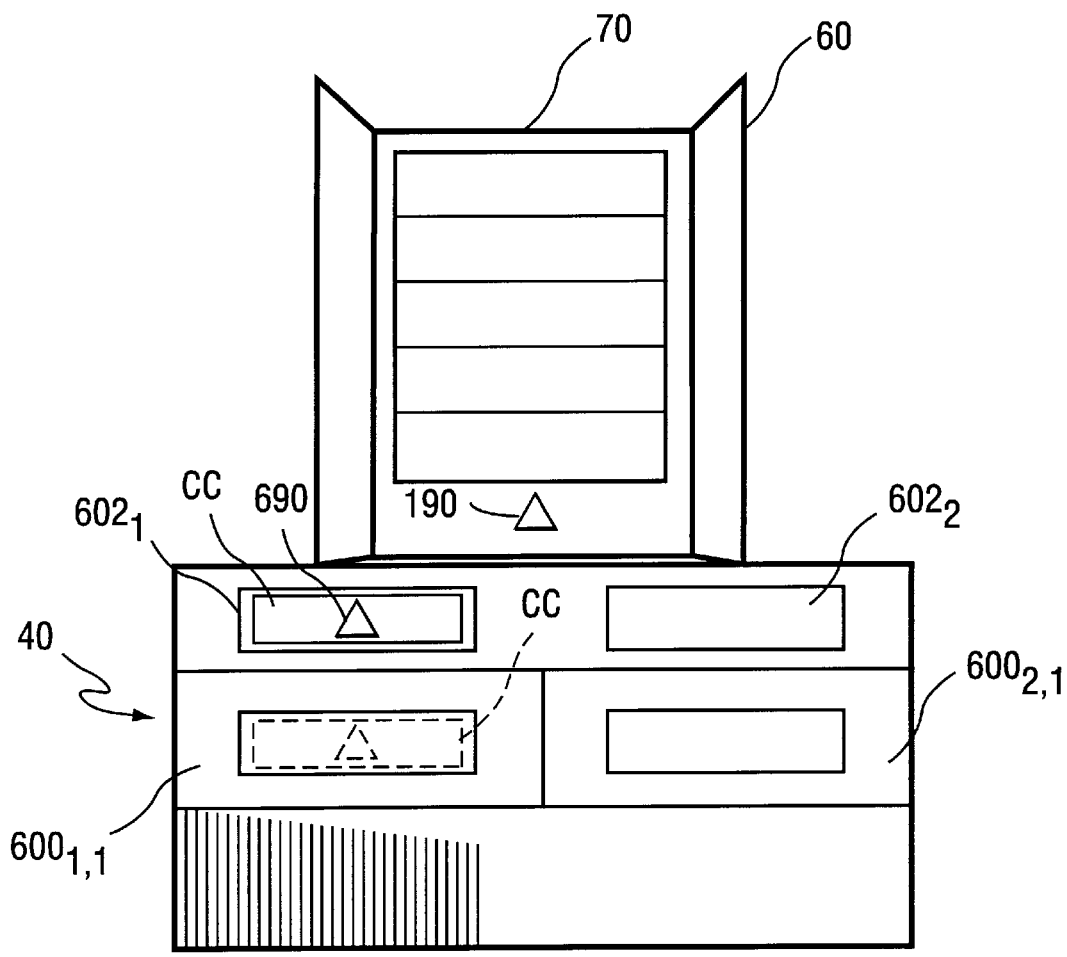
FIG. 20 is a diagrammatic view of portions of the library of FIG. 1, particularly a cabinet and a representative magazine mounting assembly with cartridge magazine aligned therewith.

FIG. 20 shows that a specially configured calibration cartridge CC has been inserted into cartridge storage position $602_1$. Calibration cartridge CC has an indicia 690 provided on a front surface thereof. Indicia 690 is essentially identical to indicia 190 above described with respect to cartridge magazine 70.

As described with reference to the basic steps illustrated in FIG. 21, library 30 uses calibration cartridge CC in order to locate the drives 600. Calibration cartridge CC is normally stored in one of the cartridge storage position $602_1$ and the cartridge storage position $602_2$. At step 21-1 controller 46 prompts cartridge gripper assembly 300 to move to stored coordinates which represent a nominal position of the particular cartridge storage position 602 in which it is anticipated that calibration cartridge CC is stored. At step 21-2, indicia 690 on calibration cartridge CC is used so that controller 46 can acquire an exact coordinate positioning of calibration cartridge CC. Usage of indicia 690 at step 21-2 is analogous to usage of indicia 190 as above described with reference to FIG. 18.

With the precise positioning of calibration cartridge CC known, at step 21-3 the cartridge gripper assembly 300 extracts the calibration cartridge CC from its cartridge storage position 602 and moves the calibration cartridge CC to a nominal vertical position of a vertically aligned drive 600. Then, at step 21-4, the calibration cartridge CC is pushed into the slot of the drive 600 (as indicated by broken lines in FIG. 20). At this point the exact positioning of drive 600 is not necessarily known. In view of this, calibration cartridge CC has beveled leading edges so that, even if not correctly aligned with the drive slot, calibration cartridge CC can nevertheless be inserted and properly seated into the slot of drive 600. The pushing of calibration cartridge CC into the drive slot is accomplished by moving the cartridge gripper assembly 300 in the Z direction using using the motor connected to motor pulley 370 (see FIG. 16) and by actuation of gripper fingers 400.

After calibration cartridge CC has been inserted into drive 600, at step 21-5 the cartridge gripper assembly 300 is backed up (moved rearwardly in the Z direction). Then, at step 21-6, indicia 690 on calibration cartridge CC is read. As understood from the previous discussion, the reading of indicia 690 involves two scans of indicia 690 and the location of a vertex thereof as cartridge gripper assembly 300 is horizontally moved across the front of drive 600, and particularly across indicia 690. Step 21-6 involves calculation similar to those described in FIG. 18 in order to locate the vertex of indicia 690, and thereby acquire exact coordinates of drive 600.

Figure 21:
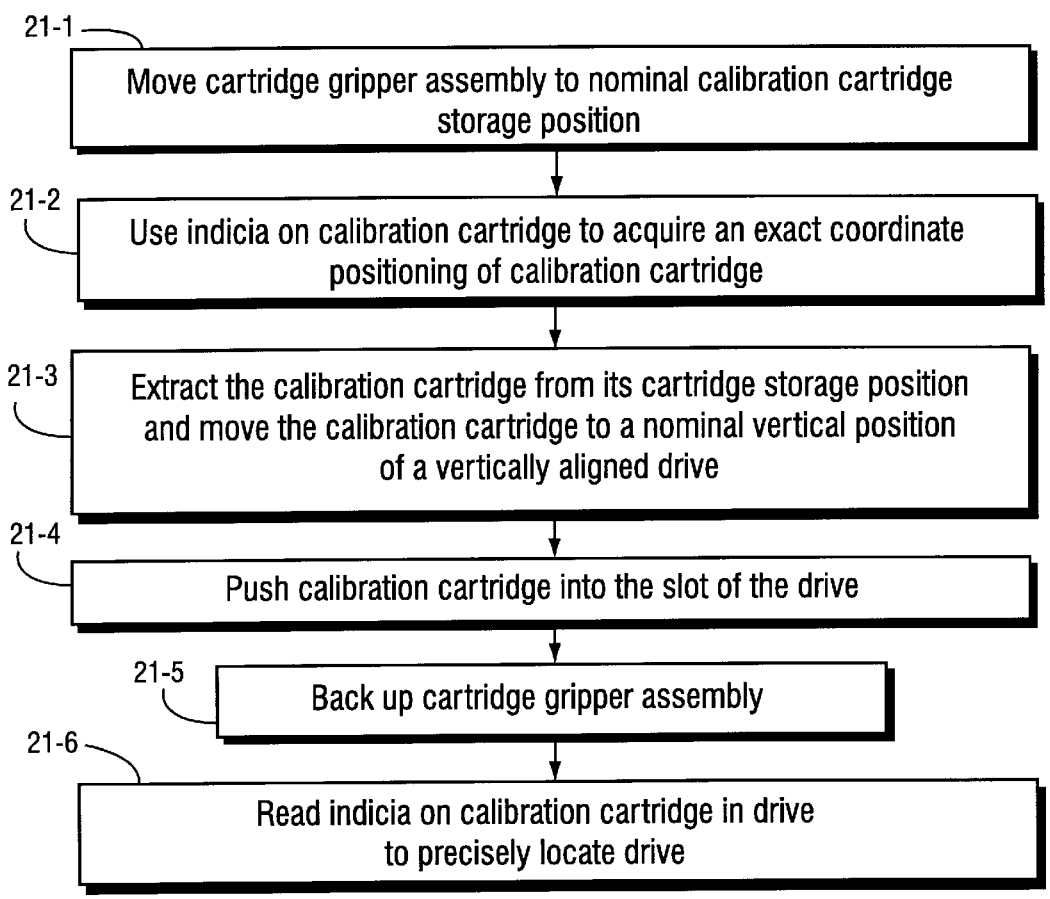
FIG. 21 is a flowchart showing basic steps involved in locating a drive included in the library of FIG. 1.

After the exact coordinates of drive 600 are determined in accordance with the steps of FIG. 21, cartridges engaged by cartridge gripper assembly 300 can be moved between drive 600 and the cells of the magazines 70.

As used herein, magazine mounting assembly 60 and cartridge storage positions (e.g., positions $602_1$ and $602_2$) are examples of cartridge-receiving units. It should be understood that the drives 600 can also be considered as cartridge-receiving units.

It should be understood that the library 30 can be scaled for cartridges of different sizes. Moreover, although the present discussion uses a ½ inch magnetic tape cartridge as an example, the invention is not limited to any particular type or size of medium. The term data storage unit or "unit" is used interchangeably herein for "cartridge e", which is also known in the industry as "cassette".

As used herein, the term "library" is intended to include systems of varying degrees of intelligence and automation, including cartridge stackers and autoloaders. Moreover, it should also be understood that the term "cartridge" as employed herein is a synonym for cassette and other commonly employed terms describing a housing wherein transducable media is contained.

The number magazines and the number of cells therein as shown in the libraries described above is merely illustrative. Greater or lesser numbers of magazines and cells can be provided.

Further, controller 46 of the libraries of the present invention can perform further operations, including (for example) communications with the drives for facilitating e.g., processing of cartridges and/or insertion/ejection of cartridges.

It should be realized that other ways of sweeping indicia of the present invention are also within the scope of the present invention. For example, rather than moving cartridge gripper assembly 300, drum 50 can be rotated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An automated cartridge library comprising:

a magazine which accommodates at least one cartridge of information storage media, the magazine having a rear wall, the rear wall being provided with an aperture;

a mounting surface upon which the magazine is mounted, the mounting surface having a reflective portion, the reflective portion of the mounting surface being exposed through the aperture of the rear wall of the magazine when a cartridge is not in a predetermined position in the magazine;

an illumination source which directs an illuminating beam toward the predetermined position in the magazine;

a cartridge absence sensor which detects illumination reflected from the reflective portion of the mounting surface when the predetermined position in the magazine is devoid of a cartridge.

2. The apparatus of claim 1, further comprising:
means for sweeping the illuminating beam; and
a controller which determines whether the sweeping of the illuminating beam fails to results in the cartridge absence sensor detecting a transition in the reflected illumination, thereby indicating absence of the magazine.

3. The apparatus of claim 1, wherein the magazine has a plurality of cells for accommodating a respective plurality of cartridges, and wherein the predetermined position is one of the plurality of cells.

4. The apparatus of claim 3, wherein the rear wall of the magazine has an aperture for each cell.

5. The apparatus of claim 4, wherein the rear wall of the magazine has two columns of apertures, with each cell of the magazine having an aperture from each of the two columns.

6. The apparatus of claim 1, wherein the reflective portion of the mounting surface is a reflective plate secured to the mounting surface.

7. The apparatus of claim 1, further comprising a transport device which selectively (1) engages and extracts a cartridge from the predetermined position in the magazine and (2) inserts and releases the cartridge into the predetermined position in the magazine, and wherein the illumination source and the cartridge absence sensor are mounted on the transport device.

8. A method of operating a cartridge library, the cartridge library being of a type having a cartridge magazine mounted on a magazine mounting surface and a cartridge picker, the magazine accommodating at least one cartridge of information storage media, the method comprising:
directing an illuminating beam toward a predetermined position in the magazine and
when a cartridge is absent from the predetermined position in the magazine the illuminating beam travels through an aperture in a rear wall of the magazines reflecting the illuminating beam off a reflection portion of the mounting surface, the rear wall of the magazine being a farthest wall of the magazine from the cartridge picker.

9. The method of claim 8, further comprising sweeping the illuminating beam along a predefined path;
determining whether the sweeping of the illuminating beam fails to results in a sensor detecting a transition in the reflected illumination, thereby indicating absence of the magazine.

10. An automated cartridge library comprising:
plural cartridge-receiving units;
a transport device for moving a cartridge between at least two of the cartridge-receiving units;
at least one of the cartridge-receiving units having an indicia provided thereon, the indicia being of contrasting reflectivity with the portion of the cartridge-receiving unit for which it is provided, the indicia having at least two sides which meet at a vertex;
an illumination source which directs an illuminating beam toward the indicia provided on the at least one of the cartridge-receiving units;
a reflected illumination sensor which detects a transition in illumination;
a controller which causes the illumination source to make two traversals across the indicia, each of the two traversals being from a first to a second of the at least two sides of the indicia, and which uses illumination transitions as detected by the sensor during the two traversals to determine a location of the vertex.

11. The apparatus of claim 10, wherein at least one of the cartridge-receiving units is a magazine which accommodates at least one cartridge.

12. The apparatus of claim 10, further comprising a drive which transduces information relative to a storage media housed in the cartridge, and wherein the at least one of the cartridge-receiving units has a predetermined alignment with the drive.

13. The apparatus of claim 10, wherein the indicia has a triangular shape.

14. The apparatus of claim 10, wherein the indicia is not co-planar with the cartridge-receiving unit upon which it is provided.

15. The apparatus of claim 14, wherein the indicia is recessed with respect to a front surface of the cartridge-receiving unit.

16. A method of operating a cartridge library wherein is housed plural cartridge-receiving units and wherein a transport device moves a cartridge between at least two of the cartridge-receiving units; the method comprising:
sweeping an illumination on two paths across an indicia provided on the at least one of the cartridge-receiving units or a calibration cartridge inserted into at least one of the cartridge-receiving units, the indicia being of contrasting reflectivity, the indicia having at least two sides which meet at a vertex, each of the two paths being from a first to a second of the at least two sides of the indicia;
using illumination transitions as detected by a sensor during the two traversals to determine a location of the vertex.

17. The method of claim 16, wherein at least one of the cartridge-receiving units is a magazine which accommodates at least one cartridge.

18. The method of claim 16, wherein the library further comprises a drive which transduces information relative to a storage media housed in the cartridge, wherein the at least one of the cartridge-receiving units is one of: (1) the drive; and (2) a calibration cartridge storage position.

19. The method of claim 16, wherein the indicia has a triangular shape.

20. The method of claim 16, wherein the indicia is not co-planar with the cartridge-receiving unit upon which it is provided.

21. The method of claim 20, wherein the indicia is recessed with respect to a front surface of the cartridge-receiving unit.

22. An automated cartridge library comprising:
a magazine which accommodates at least one cartridge of information storage media, the magazine having a rear wall, the rear wall being provided with an aperture, the magazine having a surface with an indicia provided thereon, the indicia being of contrasting reflectivity with the surface upon which it is provided, the indicia having at least two sides which meet at a vertex;
a mounting surface upon which the magazine is mounted, the mounting surface having a reflective portion, the reflective portion of the mounting surface being exposed through the aperture of the rear wall of the magazine when a cartridge is not in a predetermined position in the magazine;
at least one drive for transducing information relative to a storage media housed in the cartridge; and
a transport device for moving a cartridge between the magazine and the drive.

23. The apparatus of claim 22, further comprising an illumination source which directs an illuminating beam toward the indicia provided on the magazine;

a reflected illumination sensor which detects a transition in illumination;

a controller which causes the illumination source to make two traversals across the indicia, and which uses illumination transitions as detected by the sensor during the two traversals to determine a location of the vertex.

24. The apparatus of claim 22, wherein the indicia has a triangular shape.

25. The apparatus of claim 22, wherein the indicia is not co-planar with a surface of the magazine wherein the indicia is provided.

26. The apparatus of claim 25, wherein the indicia is recessed with respect to a front surface of the magazine.

27. The apparatus of claim 22, further comprising:

an illumination source which directs an illuminating beam toward the predetermined position in the magazine;

a cartridge absence sensor which detects illumination reflected from the reflective portion of the mounting surface when the predetermined position in the magazine is devoid of a cartridge.

28. The apparatus of claim 22, further comprising:

means for sweeping an illuminating beam;

a cartridge absence sensor; and a controller which determines whether the sweeping of the illuminating beam fails to results in the cartridge absence sensor detecting a transition in the reflected illumination, thereby indicating absence of the magazine.

* * * * *